US008693781B2

United States Patent
Nakajima

(10) Patent No.: US 8,693,781 B2
(45) Date of Patent: Apr. 8, 2014

(54) MARKER GENERATION DEVICE, MARKER GENERATION DETECTION SYSTEM, MARKER GENERATION DETECTION DEVICE, MARKER, MARKER GENERATION METHOD, AND PROGRAM THEREFOR

(75) Inventor: Noboru Nakajima, Tokyo (JP)

(73) Assignee: NEC Corporation, Tokyo (JP)

( * ) Notice: Subject to any disclaimer, the term of this patent is extended or adjusted under 35 U.S.C. 154(b) by 7 days.

(21) Appl. No.: 13/386,290

(22) PCT Filed: Jul. 22, 2010

(86) PCT No.: PCT/JP2010/062382
§ 371 (c)(1),
(2), (4) Date: Jan. 20, 2012

(87) PCT Pub. No.: WO2011/010705
PCT Pub. Date: Jan. 27, 2011

(65) Prior Publication Data
US 2012/0128254 A1     May 24, 2012

(30) Foreign Application Priority Data
Jul. 23, 2009    (JP) ................................. 2009-171841

(51) Int. Cl.
*G06K 9/46*    (2006.01)

(52) U.S. Cl.
USPC ......................................................... 382/190

(58) Field of Classification Search
None
See application file for complete search history.

(56) References Cited

U.S. PATENT DOCUMENTS

2010/0104135 A1 *    4/2010    Nakajima .................... 382/103

FOREIGN PATENT DOCUMENTS

CN    1811793  A    8/2006

OTHER PUBLICATIONS

Making Good Features Track Better. Tommasini et al. Jun. 1998.*
On the Optimal Detection of Curves in Noisy Pictures. Montanari et al. May 1971.*
Separating Reflection Components of Textured Surfaces Using a Single Image. Tan et al. Feb. 2005.*
Multiple View Geometry. Hartley et al. Jun. 1999.*
Tommasini et al; "Making Good Features Track Better", Computer Vision and Pattern Recognition, Jun. 23-25, 1998, 6 pgs.
Montanari et al, "On the Optimal Detection of Curves in Noisy Pictures", Communication of the ACM, vol. 14, No. 5, May 1971, pp. 335-345.

(Continued)

*Primary Examiner* — Stephen R Koziol
*Assistant Examiner* — Delomia Gilliard
(74) *Attorney, Agent, or Firm* — Sughrue Mion, PLLC

(57) ABSTRACT

Provided is a marker generation device which has a feature comparison means and a marker pattern generation means. The feature comparison means disposes feature points extracted from an image in a predetermined space, sets parts in which the number of feature points in the predetermined space is equal to or less than a predetermined number as singular features, disposes feature points extracted from an identifier in the predetermined space, and counts the number of feature points that coincide with the singular features. The marker pattern generation means converts the structure of the identifier and extracts the feature points from the converted identifier. The feature comparison means disposes the feature points extracted from the converted identifier in the predetermined space, counts the number of feature points that coincide with the singular features, and selects, as a marker for detection, an identifier having the most counts from among identifiers before conversion and one or two or more identifiers that have been converted.

16 Claims, 37 Drawing Sheets

(56) References Cited

OTHER PUBLICATIONS

Tan et al, "Separating Reflection Components of Textured Surfaces Using a Single Image", IEEE Transactions on Pattern Analysis and Machine Intelligence, vol. 27, No. 2, Feb. 2005, pp. 178-193.

Finlayson et al, "On the Removal of Shadows from Images", IEEE Transactions on Pattern Analysis and Machine Intelligence, vol. 28, No. 1, Jan. 2006, pp. 59-68.

Pun et al, "Log-Polar Wavelet Energy Signatures for Rotation and Scale Invariant Texture Classification", IEEE Transactions on Pattern Analysis and Machine Intelligence, vol. 25, No. 5, May 2003, pp. 590-602.

Hartley et al, "Multiple View Geometry", CVPR, Jun. 1999, 57 pgs.

\* cited by examiner

FIG. 3

<UNIQUE FEATURE INFORMATION TABLE>

| A | B | C | D |
|---|---|---|---|
| F1 | t1 | $x_{1001}$ | $y_{1001}$ |
|  | t2 | $x_{1002}$ | $y_{1002}$ |
|  | t3 | $x_{1003}$ | $y_{1003}$ |
|  | t4 | $x_{1004}$ | $y_{1004}$ |
|  | t5 | $x_{1005}$ | $y_{1005}$ |

A: SERIAL NUMBER OF UNIQUE FEATURE INFORMATION TABLE
B: SERIAL NUMBER OF UNIQUE FEATURE
C: X COORDINATE OF UNIQUE FEATURE
D: Y COORDINATE OF UNIQUE FEATURE

FIG. 4

<IDENTIFIER FEATURE INFORMATION TABLE>

| A | B | C | D |
|---|---|---|---|
|    | t1 | $x_{101}$ | $y_{101}$ |
|    | t2 | $x_{102}$ | $y_{102}$ |
| M1 | t3 | $x_{103}$ | $y_{103}$ |
|    | t4 | $x_{104}$ | $y_{104}$ |
|    | t5 | $x_{105}$ | $y_{105}$ |

A: SERIAL NUMBER OF IDENTIFIER
B: SERIAL NUMBER OF FEATURE POINT
C: X COORDINATE OF FEATURE POINT
D: Y COORDINATE OF FEATURE POINT (FEATURE SPACE)

(FEATURE SPACE)

(FEATURE SPACE)

(FEATURE SPACE)

■ SECTIONS IN WHICH FEATURE POINTS MATCHING WITH UNIQUE FEATURES ARE LOCATED (FEATURE SPACE)

(FEATURE SPACE)

■ SECTIONS IN WHICH FEATURE POINTS MATCHING WITH UNIQUE FEATURES ARE LOCATED (MATRIX PATTERN FOR CONVERSION)

(CONVERSION RESULT)

(FEATURE POINT)

(FEATURE SPACE)

(FEATURE SPACE)

■ SECTIONS IN WHICH FEATURE POINTS MATCHING WITH UNIQUE FEATURES ARE LOCATED (BACKGROUND VIDEO IMAGE)

(FEATURE SPACE)

FIG. 24

<FEATURE POINT INFORMATION TABLE>

| A | B | C | D |
|---|---|---|---|
|  | t1 | $x_{1001}$ | $y_{1001}$ |
|  | t2 | $x_{1002}$ | $y_{1002}$ |
| f1 | t3 | $x_{1003}$ | $y_{1003}$ |
|  | t4 | $x_{1004}$ | $y_{1004}$ |
|  | t5 | $x_{1005}$ | $y_{1005}$ |

A: SERIAL NUMBER OF FRAME IMAGE
B: SERIAL NUMBER OF FEATURE POINT
C: X COORDINATE OF FEATURE POINT
D: Y COORDINATE OF FEATURE POINT

<FEATURE POINT NUMBER DISTRIBUTION DIAGRAM>

(FEATURE POINTS EXTRACTED BY IDENTIFIER)

(FEATURE SPACE)

(INVARIANT FEATURE SPACE)

(INVARIANT FEATURE SPACE)

(INVARIANT FEATURE SPACE)

(INVARIANT FEATURE SPACE)

(INVARIANT FEATURE SPACE)

(MARKER PATTERN GENERATION SCOPE)

(MARKER PATTERN GENERATION SCOPE)

(DETECTION-TARGETED VIDEO IMAGE)

(FEATURE SPACE)

FEATURE POINTS EXTRACTED BY IDENTIFIER

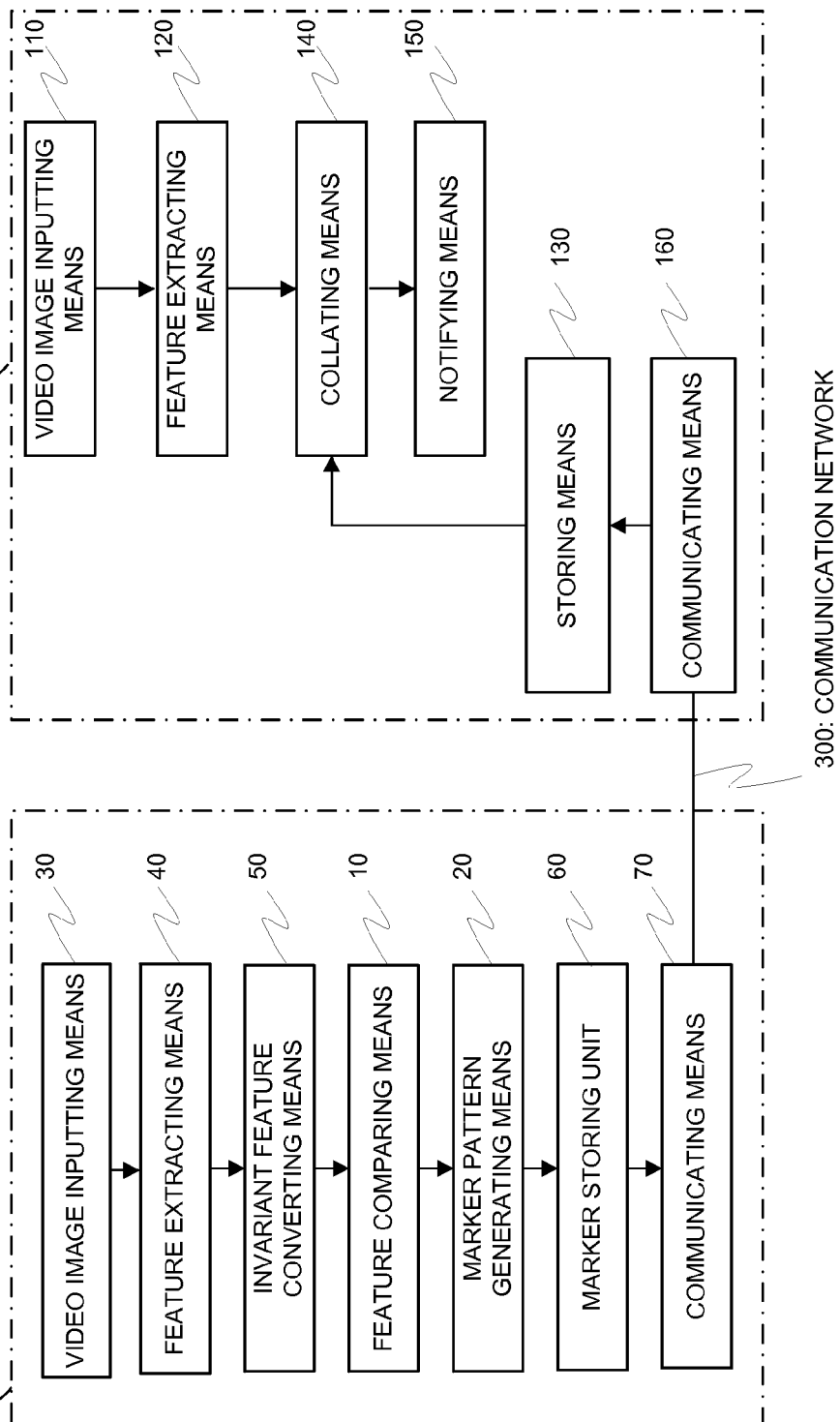

MARKER GENERATION DEVICE, MARKER GENERATION DETECTION SYSTEM, MARKER GENERATION DETECTION DEVICE, MARKER, MARKER GENERATION METHOD, AND PROGRAM THEREFOR

CROSS REFERENCE TO RELATED APPLICATIONS

This application is a National Stage of International Application No. PCT/JP2010/062382, filed on Jul. 22, 2010, which claims priority from Japanese Patent Application No. 2009-171841, filed on Jul. 23, 2009, the contents of all of which are incorporated herein by reference in their entirety.

TECHNICAL FIELD

The present invention relates to a marker generation device for determining whether or not an existing identifier can be used as a detection marker, a marker generation detection system provided with this marker generation device, a marker generation detection device provided with a marker determination function, a marker determined to be usable as the detection marker by the marker determination function, a marker generation method of making a determination of its detection marker, and a marker generation program for executing this marker determination.

BACKGROUND ART

As a method of identifying whether or not a desired object exists in a certain space, the following method exists.

For example, the technology of imaging the image of the space in which no marker exists as a background video image with an video image inputting means in a marker generation stage, extracting feature points from the above background video image, mapping these feature points onto an invariant feature space, thereby to define them as invariant features, defining portions in which these invariant features do not appear as unique features, generating a marker pattern based upon these unique features, and in a marker detection stage, imaging the image of the space containing the object added with the marker as a detection-targeted video image, extracting the feature points from this detection-targeted video image, determining whether or not a segment matching with an arrangement of the feature points extracted from the marker pattern exists in an arrangement of these feature points, and detecting this as the marker when the matching one exists (for example, see Patent Literature 1).

With this technology, the pattern not appearing in the background video image can be generated as the marker pattern in the marker generation stage. This prevents the marker from being erroneously detected from a location in which no marker exists, out of the detection-targeted video images, thereby enabling the marker added to the objet to be surely detected in the marker detection stage.

CITATION LIST

Patent Literature

PTL 1: International Publication No. WO2008/090908 (pamphlet)

SUMMARY OF INVENTION

Technical Problem

However, in the technology described in the above-mentioned Patent literature 1, the following situation surfaces.

The same technology generates the marker based upon the unique features.

And, the same technology detects the object added with the above marker in the marker detection stage.

By the way, as the object that may be defined as a target of detection in the marker detection stage, for example, there exist products. The products are put side by side on store, and purchased by consumers.

As a thing to be added to this product, for example, there exists an identifier such as a barcode and a two-dimensional code. The identifier is one obtained by encoding a manufacturer, a manufacturing number, a lot number, a manufacturing date, and the like of the above product.

Detecting this identifier as the marker enables the products having a different manufacturer or the like to be distinguished and detected.

As it is, the identifier is one generated according to an original rule, and not one generated based upon the unique features.

For this reason, the feature points extracted from the identifier do not always match with the unique features. As a result, it follows that the identifier cannot be detected and the product cannot be distinguished.

Thereupon, it is required to make a proposal of the technology capable of detecting the identifier as the marker.

The present invention has been accomplished in consideration of the above-mentioned situations, and an object thereof is to provide a marker generation device, a marker generation detection system, a marker generation detection device, a marker, a marker generation method, and a marker generation program that enable the identifier to be detected as the marker.

Solution to Problem

The present invention is a marker generation device in which feature points extracted from an image are arranged in a predetermined space, and portions of this predetermine space in which the number of said feature points is equal to or less than a predetermined number are defined as unique features, comprising: a feature comparing means that arranges the feature points extracted from an identifier in the predetermined space, and counts the number of the feature points matching with said unique features; and a marker pattern generating means that converts a configuration of said identifier, and extracts said feature points from this identifier subjected to the conversion, wherein said feature comparing means arranges the feature points extracted from said identifier subjected to the conversion in said predetermined space, counts the number of the feature points matching with said unique features, and selects as a detection marker the identifier of which said count number is most numerous, out of the identifier not subjected to the conversion and one identifier subjected to the conversion, or two or more.

The present invention is a marker generation detection system comprising a marker generation device and a marker detection device: wherein said marker generation device comprises: a first video image inputting means that inputs an image; a first arranging means that extracts feature points from said image inputted by this first video image inputting means, and displays these extracted feature points onto a predetermined space; a unique feature selecting means that selects as unique features portions of said space in which the number of said feature points is equal to or less than a predetermined number; a feature comparing means that arranges the feature points extracted from an identifier in the predetermined space, and counts the number of the feature points matching with said unique features; and a marker pattern generating means that converts a configuration of said identifier, and extracts said feature points from this identifier subjected to the conversion; wherein said feature comparing means arranges the feature points extracted from said identifier subjected to the conversion in said predetermined space, counts the number of the feature points matching with said unique features, and selects as a detection marker the identifier of which said count number is most numerous, out of the identifier not subjected to the conversion and one identifier subjected to the conversion, or two or more; and wherein said marker detection device comprises: a second video image inputting means that inputs the image; a second arranging means that extracts the feature points based upon said image inputted by this second video image inputting means, and displays these extracted feature points onto the predetermined space; and a collating means that determines whether or not an arrangement of the feature point based upon said detection marker exists in an arrangement of a feature point group displayed onto said predetermined space.

The present invention is a marker generation detection device, comprising: a first video image inputting means that inputs an image; a first arranging means that extracts feature points from said image inputted by this first video image inputting means, and displays these extracted feature points onto a predetermined space; a unique feature selecting means that selects as unique features portions of said space in which the number of said feature points is equal to or less than a predetermined number; a feature comparing means that arranges the feature points extracted from an identifier in the predetermined space, and counts the number of the feature points matching with said unique features; a marker pattern generating means that converts a configuration of said identifier, and extracts said feature points from this identifier subjected to the conversion; a marker storing means that stores a marker; a second video image inputting means that inputs the image; a second arranging means that extracts the feature points based upon said image inputted by this second video image inputting means, and displays these extracted feature points onto the predetermined space; and a collating means that determines whether or not an arrangement of the feature point corresponding to said marker exists in an arrangement of a feature point group displayed onto said predetermined space, wherein said feature comparing means arranges the feature points extracted from said identifier subjected to the conversion in the said predetermined space, counts the number of the feature points matching with said unique features, and selects as a detection marker the identifier of which said count number is most numerous, out of the identifier not subjected to the conversion and one identifier subjected to the conversion, or two or more.

The present invention is a marker, wherein said marker is, when feature points are extracted from an image, these extracted feature points are displayed in a predetermined space, portions of said predetermine space in which the number of said feature points is equal to or less than a predetermined number are selected as unique features, the feature points are selected from an identifier, these feature points are arranged in said predetermined space, the number of the feature points matching with said unique features is counted, a configuration of said identifier is converted, the feature points are extracted from the identifier subjected to the conversion, these feature points are arranged in the predetermined space, the number of the feature points matching with said unique features is counted, and the identifier having a largest count number, out of respective numbers of the identifiers not subjected to the conversion and subjected to the conversion, is selected as a detection marker, the above selected identifier.

The present invention is a marker generation method comprising the steps of: inputting an image; extracting feature points from said image, and displaying these extracted feature points onto a predetermined space; selecting as unique features portions of said space in which the number of said feature points is equal to or less than a predetermined number; arranging the feature points extracted from an identifier in the predetermined space, and counting the number of the feature points matching with said unique features; converting a configuration of said identifier, and extracting said feature points from this identifier subjected to the conversion; and arranging the feature points extracted from said identifier subjected to the conversion in said predetermined space, counting the number of the feature points matching with said unique features, and selecting as a detection marker the identifier of which said count number is most numerous, out of the identifier not subjected to the conversion and one identifier subjected to the conversion, or two or more.

The present invention is a marker generation program for causing an information processing device to execute the processes of: inputting an image; extracting feature points from said image, and displaying these extracted feature points onto a predetermined space; selecting as unique features portions of said space in which the number of said feature points is equal to or less than a predetermined number; arranging the feature points extracted from an identifier in the predetermined space, and counting the number of the feature points matching with said unique features; converting a configuration of said identifier, and extracting said feature points from this identifier subjected to the conversion; and arranging the feature points extracted from said identifier subjected to the conversion in said predetermined space, counting the number of the feature points matching with said unique features, and selecting as a detection marker the identifier of which said count number is most numerous, out of the identifier not subjected to the conversion and one identifier subjected to the conversion, or two or more.

Advantageous Effect of Invention

The marker generation device, the marker generation detection system, the marker generation detection device, the marker, the marker generation method, and the marker generation program of the present invention are configured to extract the feature points from the identifier, being a determination target, to arrange these feature points in a predetermined space, to count the number of the feature points matching with the unique features, to make a count thereof whenever converting a data arrangement pattern of the identifier, and to select the identifier with the data arrangement pattern having a largest count value as the detection marker, whereby the above identifier can be detected as the marker.

BRIEF DESCRIPTION OF DRAWINGS

FIG. 3 is a chart illustrating a configuration of a unique feature information table.

FIG. 4 is a chart illustrating a configuration of an identifier feature information table.

FIG. 24 is a chart illustrating a configuration of the feature point information table.

FIG. 52 is a block diagram illustrating a configuration of the marker generation detection system.

DESCRIPTION OF EMBODIMENTS

Hereinafter, the preferred exemplary embodiments of the marker generation device, the marker generation detection system, the marker generation detection device, the marker, the marker generation method, and the marker generation program relating to the present invention will be explained by making a reference to the accompanied drawings.

The First Exemplary Embodiment of the Marker Generation Device and the Marker Generation Method At first, the first exemplary embodiment of the marker generation device and the marker generation method of the present invention will be explained by making a reference to FIG. 1. The same figure is a block diagram illustrating a configuration of the marker generation device of this exemplary embodiment.

(I) (Marker Generation Device)

Figure 1:
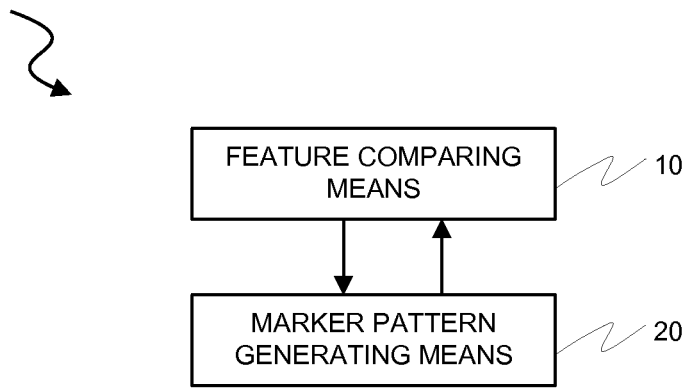
FIG. 1 is a block diagram illustrating a configuration of the marker generation device in a first exemplary embodiment of the present invention.

As shown in FIG. 1, a marker generation device 1a is provided with a feature comparing means 10 and a marker pattern generating means 20.

Figure 2:
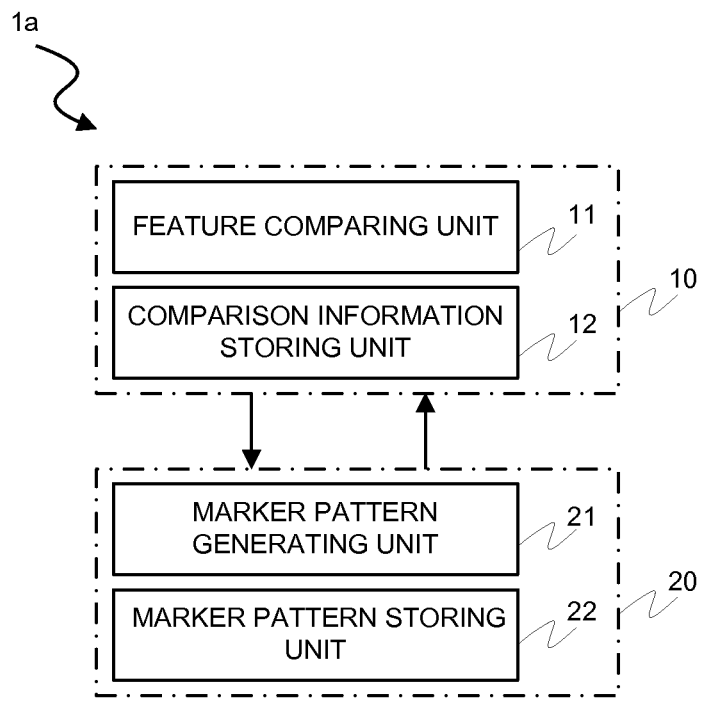
FIG. 2 is a block diagram illustrating a detailed configuration of the marker generation device in the first exemplary embodiment of the present invention.

The feature comparing means 10 includes a feature comparing unit 11 and a comparison information storing unit 12 as shown in FIG. 2.

The feature comparing unit 11 inputs "the unique feature information table" from the outside. And, the feature comparing unit 11 inputs "the identifier feature information table" from the outside or the marker pattern generating means 20. The comparison information storing unit 12 stores "the unique feature information table" and "the identifier feature information table"

"The unique feature information table" is a table in which data related to the unique features arranged in a predetermined space has been put together. This "unique feature information table", as shown in FIG. 3, may include "a serial number of the table" (A), "a serial number of the unique feature" (B), "an x coordinate of the unique feature" (C), and a y coordinate of the unique feature" (D) as an item, respectively.

When one unique feature information table, or two or more exists, "the serial number of the table" is indicative of the number (No.) added to each unique feature information table. When the video image to be inputted by a video image inputting means 30 (to be later described) is configured of a plurality of frame images, the above number is equivalent to a number added for each frame image.

"The serial number of the unique feature" is indicative of a number added to each of a plurality of the unique features.

"The x coordinate of the unique feature" is indicative of an x coordinate of the above unique feature in the predetermined space.

"The y coordinate of the unique feature" is indicative of a y coordinate of the above unique feature in the predetermined space.

Additionally, the predetermined space includes, for example, the feature space, the invariant feature space, the unique feature space and the like.

Further, the feature space, the invariant feature space, and the unique feature space will be explained in details in the second exemplary embodiment. In addition, the method of extracting the unique features or the like will be also explained in details in the second exemplary embodiment.

"The identifier feature information table", as shown in FIG. 4, may include "a serial number of the identifier" (A), "a serial number of the feature point" (B), "an x coordinate of the feature point" (C), and "a y coordinate of the feature point" (D) as an item, respectively.

"The serial number of the identifier" is indicative of a number added to one identifier, or each of two or more identifiers. Further, "the serial number of the identifier" may indicate a number added to the identifier not subjected to the conversion and a number added to the identifier subjected to the conversion in such a manner that they are distinguished from each other.

"The serial number of the feature point" is indicative of a number added to one feature point, or each of two or more feature points based upon the identifier.

"The x coordinate of the feature point" is indicative of an x coordinate of the above feature point in the predetermined space.

"The y coordinate of the feature point" is indicative a y coordinate of the above feature point in the predetermined space.

The feature comparing unit 11 may cause the comparison information storing unit 12 to store this "identifier feature information table" of which number is one, or two or more.

Additionally, "the predetermined space" includes, for example, the feature space, the invariant feature space and the like.

Further, "the feature point" includes the feature point extracted from the identifier, the feature point arranged in the feature space, invariant feature arranged in the invariant feature space, and the like.

These feature space and invariant feature space will be explained in details in the third exemplary embodiment. In addition, the method of extracting the invariant features, or the like will be also explained in details in the third exemplary embodiment.

Further, the feature comparing unit 11 takes out "the unique feature information table" and "the identifier feature information table" from the comparison information storing unit 12.

Figure 5:
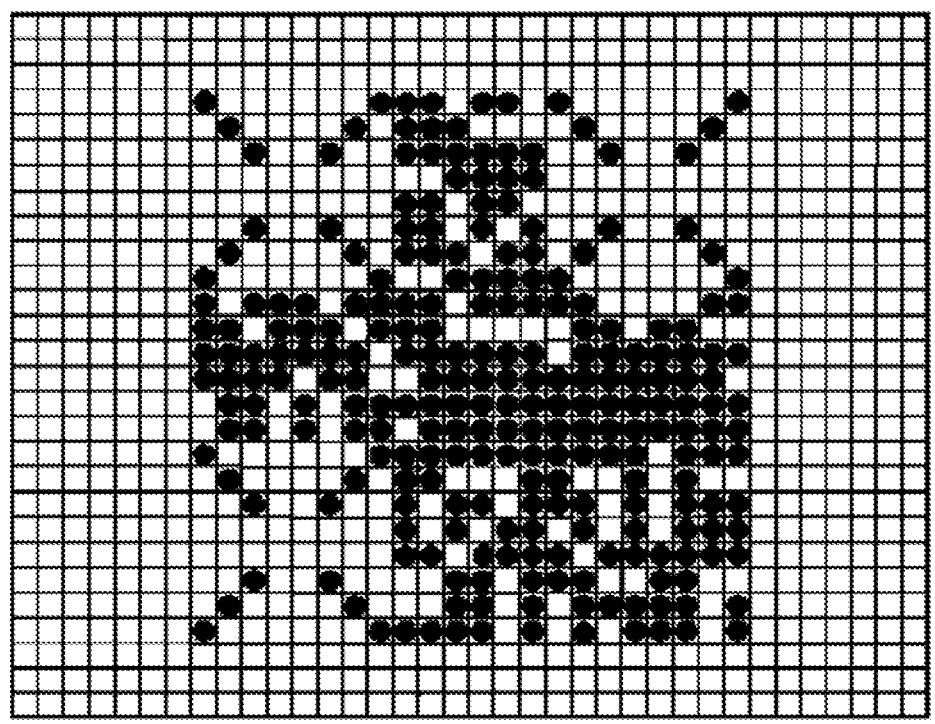
FIG. 5 is a view illustrating a feature space having the feature points of the identifier arranged therein.
Figure 6:
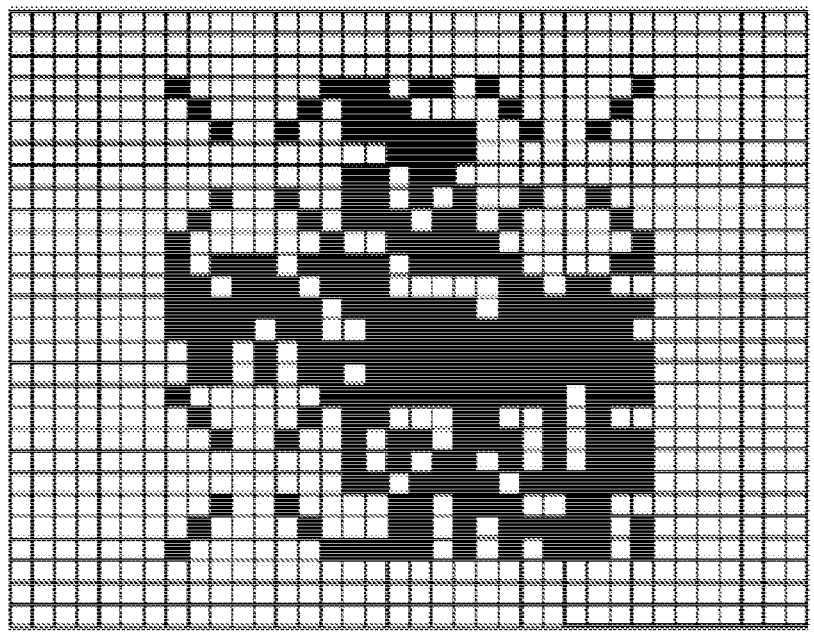
FIG. 6 is a view illustrating a situation in which segment lines have been added to the feature space having the feature points of the identifier arranged therein.

Next, the feature comparing unit 11 makes a reference to "the identifier feature information table" and arranges the feature points of the identifier in the predetermined space (for example, feature space). The predetermined space having these feature points arranged therein is shown in FIG. 5 and FIG. 6. FIG. 5 is a view illustrating a situation in which the feature points extracted from a QR code, being the identifier, are arranged in the feature space. FIG. 6 is a view illustrating a situation in which the segments having the feature points arranged therein are filled-in in a black color.

Figure 7:
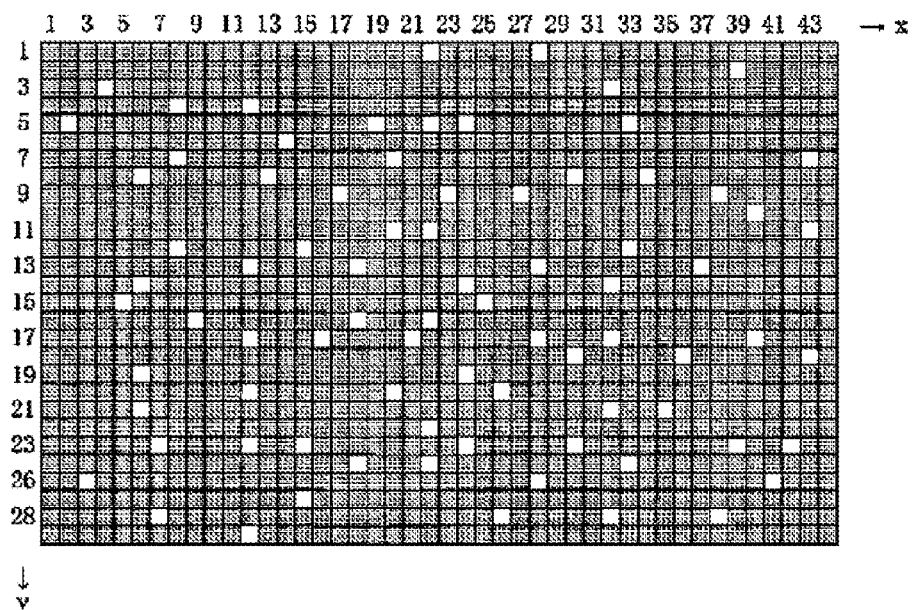
FIG. 7 is a view illustrating the feature space having the unique features arranged therein.

Continuously, the feature comparing unit 11 takes out the coordinates of the unique features from "the unique feature information table". And, the feature comparing unit 11 arranges the unique features in the predetermined space (for example, feature space) according to these coordinates. The predetermined space having these unique features arranged therein is shown in FIG. 7. In the same figure, the segments with a white color are the unique features.

And, the feature comparing unit 11 selects the feature points of the identifier matching with the unique features, and counts the number thereof.

This process may be performed by superposing an arrangement of the unique features shown in FIG. 7 and an arrangement of the feature points shown in FIG. 6 upon each other and determining whether or not the former matches with the latter. Further, a determination thereof may be made by comparing/collating the coordinate of the feature point of the identifier with the coordinate of the unique feature, and determining whether or not the former matches with the latter.

That is, the feature comparing unit 11 arranges the feature points of the identifier in the predetermined space having the unique features arranged therein, and counts the number of the feature points of the identifier arranged in a segment identical to that of the unique feature.

Figure 8:
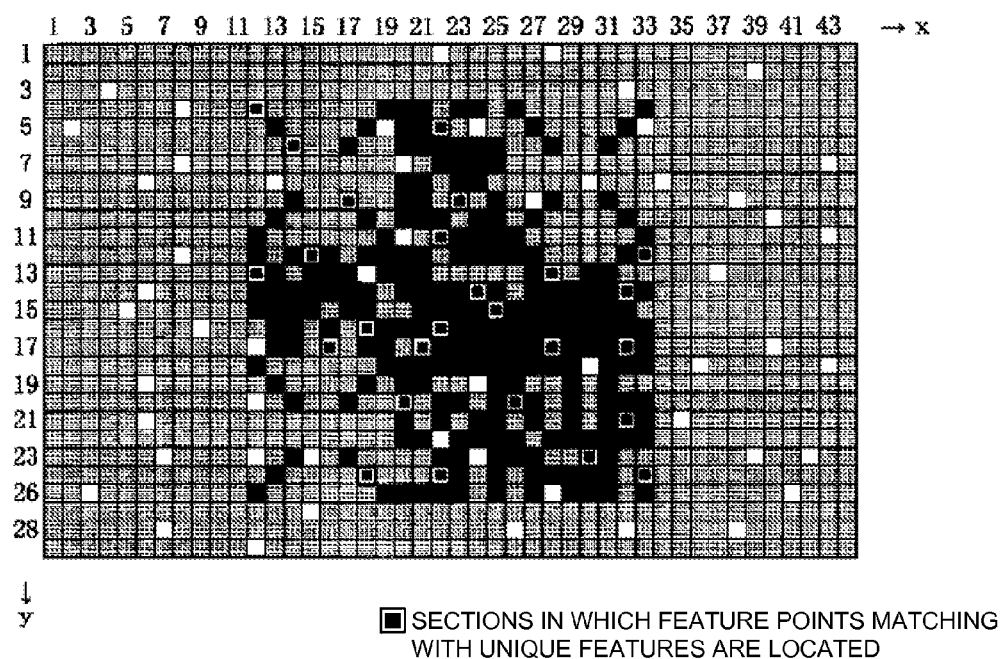
FIG. 8 is a view illustrating the feature space having the feature points of the identifier and the unique features arranged therein.

A result of this superposition is shown in FIG. 8. In FIG. 8, the segments indicated by double-square symbols are indicative of the segments having the feature points matching with the unique features arranged therein. With the case shown in the same figure, 26 feature points, out of 247 feature points of the identifier, match with the unique features. This count number (26 in FIG. 8) is stored in the comparison information storing unit 12.

Next, the feature comparing unit 11 determines whether or not "the identifier feature information table" not subjected yet to a process of matching with the unique features has been stored in the comparison information storing unit 12.

When the above "identifier feature information table" exists as a result of the determination, the feature comparing unit 11 takes out the above "identifier feature information table" from the comparison information storing unit 12.

And, the feature comparing unit 11 performs the matching process having the above-described content for the above "identifier feature information table". In addition, the feature comparing unit 11 counts the number of the segments having the feature points of the identifier matching with the unique features arranged therein, and causes the comparison information storing unit 12 to store this count value.

The comparison information storing unit 12 stores data and a program related to the matching process (process of counting the number of the feature points matching the unique features in the predetermined space) to be performed by the feature comparing unit 11.

Further, the comparison information storing unit 12 stores "the unique feature information table", "the identifier feature information table", the count value obtained by the matching process, and the like.

The count value is stored correspondingly to the number (No.) added to the identifier not subjected to the conversion or the identifier subjected to the conversion. This count value is also stored in a marker pattern storing unit 22.

The marker pattern generation means 20 includes a marker pattern generating unit 21 and the marker pattern storing unit 22 as shown in FIG. 2.

The marker pattern generating unit 21 inputs date related to the identifier from the outside. This data related to the identifier contains data displayed in a data region of the identifier. The date related to the identifier is stored in the marker pattern storing unit 22.

Further, the marker pattern generating unit 21 performs a process of converting the identifier according to a predetermined rule. The so-called process of converting the identifier points to a process of converting a sequence pattern of data displayed in the data region of the identifier while keeping the above data itself at an identical value.

Specifically, the conversion may be performed with the following method.

An example of the identifier is shown in FIG. 9(i). It is assumed that the QR code is employed as the identifier. However, the identifier is not limited to the QR code, and may contain various codes such as a barcode and a two-dimensional code.

Herein, the QR code, being the identifier, includes a positioning symbol and a data region.

The positioning symbol is a symbol arranged in a corner of the QR code in order to decide a loading-in direction of the data indicated in the data region. Detecting this positioning symbol enables the corner or the edge of the QR code to be specified, and the loading-in scope and the loading-in direction of the data region to be specified.

The data region is a region having the data displayed therein. In the QR code, the almost part other than the positioning symbol comes under the data region. In this data region, normally, the data is displayed in a binary value of the white cell or the black cell.

With the data related to the identifier inputted from the outside, the marker pattern generating unit 21 can recognize that the above identifier has, for example, the arrangement pattern of the data shown in FIG. 9(i).

Further, the marker pattern generating unit 21 takes out the matrix pattern for conversion from the marker pattern storing unit 22.

The matrix pattern for conversion, which is employed at the moment of converting the data arrangement pattern of the identifier, is a pattern as shown in the same figure (ii), for example.

The display pattern with the white cell or the black cell that this matrix pattern for conversion indicates may be decided arbitrarily, or it may be also decided according to a predetermined rule. As an example of the latter, for example, there is the case in which the cells are arranged repeatedly in an order of two white cells and one black cell (for example, see FIG. 13).

The marker pattern generating unit 21 converts the data for each cell of the data region of the identifier by employing the matrix pattern for conversion. That is, dependent upon which color (data) is used for a cell of the matrix pattern for conversion, the method of converting one cell of the data region of the identifier corresponding to the above cell is governed.

This data conversion is performed according to a predetermined rule. A logic equation such as Exclusive-OR may be employed for the predetermined rule (FIG. 9(iii)). Specifically, for example, when the color (data) of one cell of the matrix pattern for conversion is white, the data of the corresponding cell of the identifier is not converted, namely, as it stands. That is, the white cell remains the white cell, and the black cell remains the black cell.

On the other hand, when the color (data) of one cell of the matrix pattern for conversion is black, the data of the corresponding cell of the identifier is reversed. That is, the white cell is converted into the black cell, and the black cell is converted into the white cell.

Figure 9:
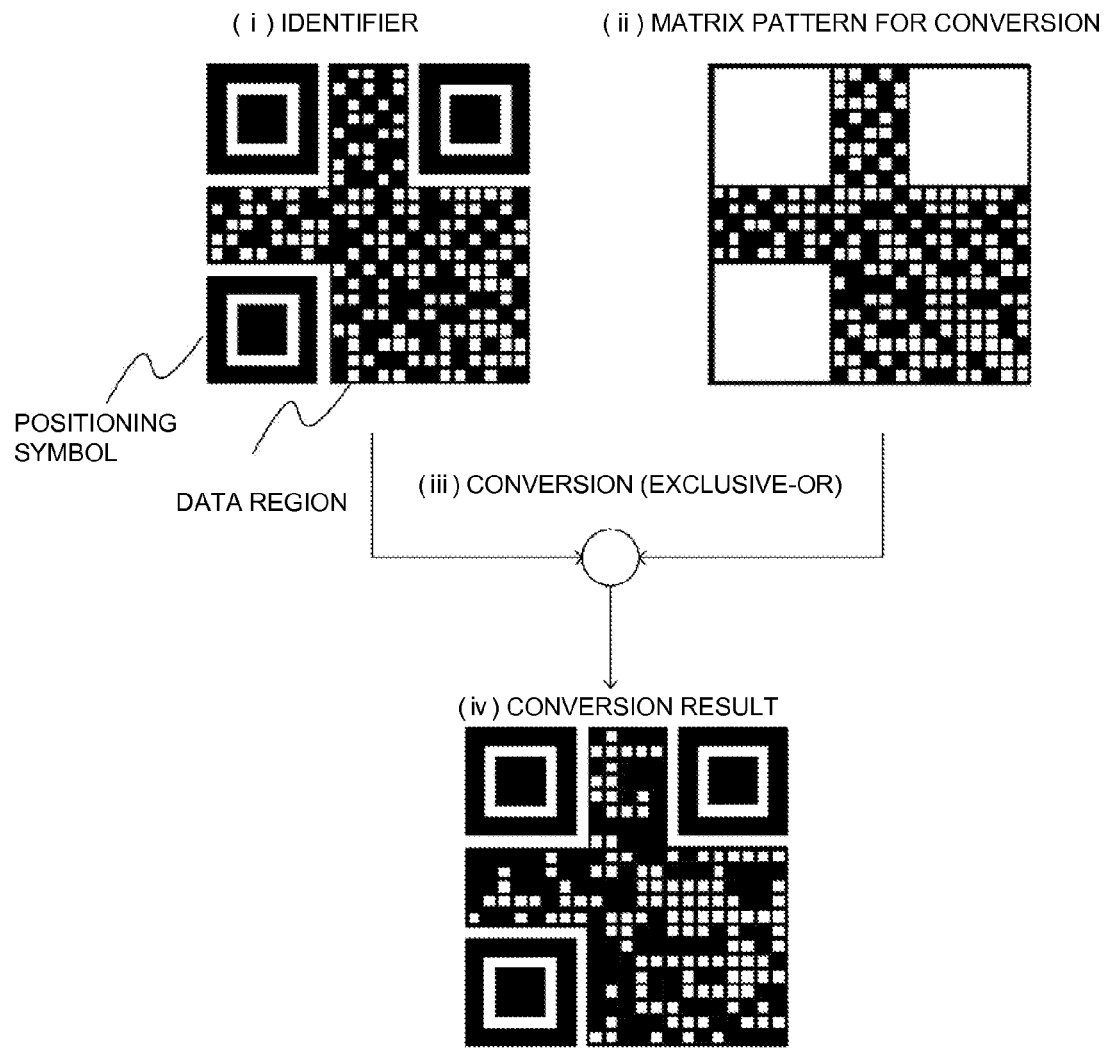
FIG. 9 is a view illustrating a procedure of converting the data arrangement pattern of the identifier.

A result of having converted the data of each cell of the identifier shown in FIG. 9(i) according to this rule is shown in FIG. 9(iv).

Figure 10:
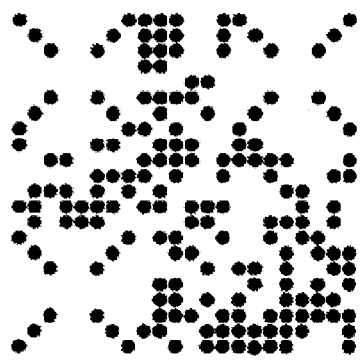
FIG. 10 is a view illustrating the feature points of the identifier.

Next, the marker pattern generating unit 21 extracts the feature points from the identifier subjected to the conversion. These extracted feature points are shown in FIG. 10.

Figure 11:
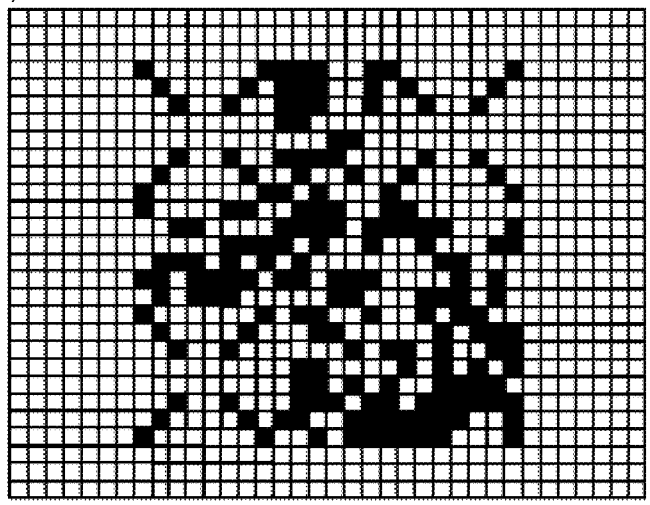
FIG. 11 is a view illustrating the feature space having the feature points of the identifier arranged therein.

Continuously, the marker pattern generating unit 21, as shown in FIG. 11, arranges the extracted feature points in the feature space. Further, the marker pattern generating unit 21 partitions the above feature space into a plurality of the segments, and obtains the number of the arranged feature points for each segment. In addition, the marker pattern generating unit 21 selects the segments in which the number of the feature points is equal to more than a predetermined number. In FIG. 11, the segments in which the number of the feature points is "one (1)" or more are displayed in a black color.

And, the marker pattern generating unit 21 generates "the identifier feature information table" containing the coordinates of the segments in which these feature points have been arranged in a predetermined number. The marker pattern generating unit 21 causes the comparison information storing unit 12 and the marker pattern storing unit 22 to store the generated "identifier feature information table".

Figure 12:
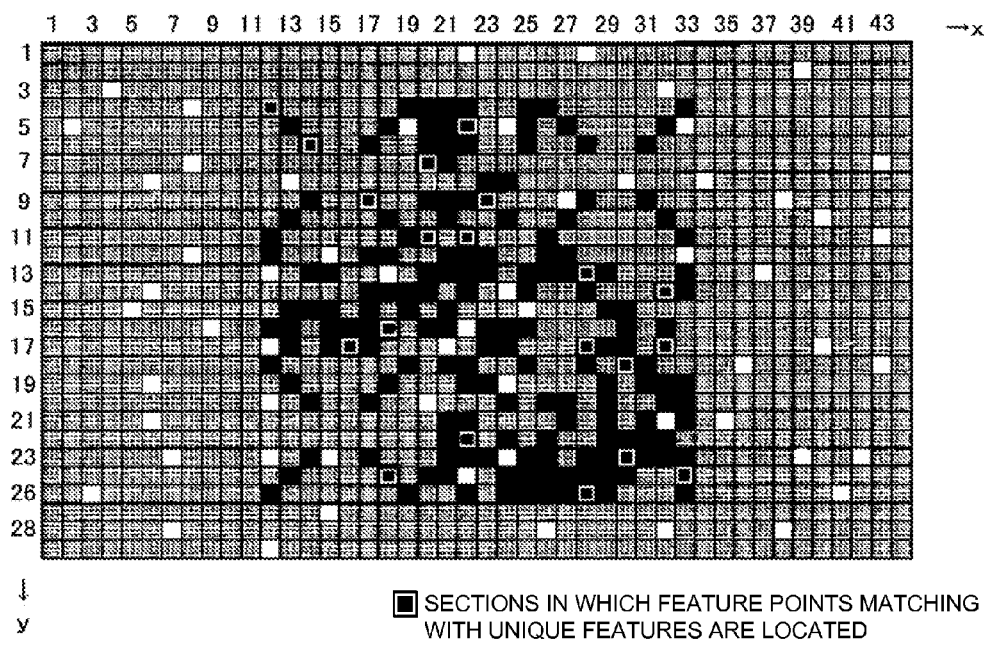
FIG. 12 is a view illustrating the feature space having the feature points of the identifier and the unique features arranged therein.

This "identifier feature information table" is stored in the comparison information storing unit 12, thereby allowing the feature comparing unit 11 to perform the matching process by making a reference to the above "identifier feature information table". That is, the feature comparing unit 11 arranges the segments containing the feature points extracted from the identifier subjected to the conversion in the feature space shown in FIG. 7. A situation of this arrangement is shown in FIG. 12. And, the feature comparing unit 11 counts the number of the feature points matching with the unique features, and causes the comparison information storing unit 12 to store this count value. Additionally, the count value is "20" in FIG. 12.

Figure 13:
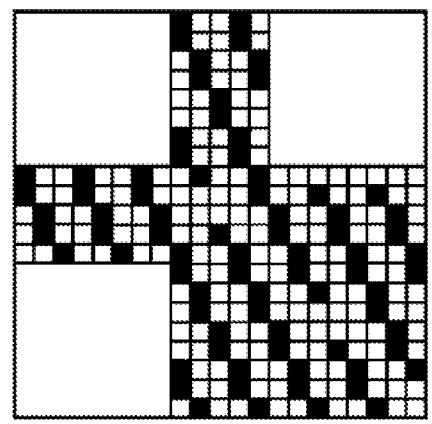
FIG. 13 is a view illustrating an example of a matrix pattern for conversion.
Figure 14:
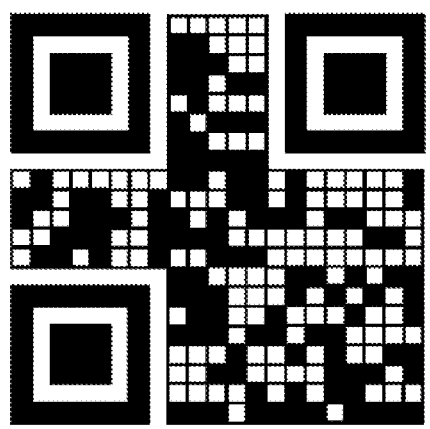
FIG. 14 is a view illustrating a configuration of the identifier converted by employed the matrix pattern for conversion shown in FIG. 13.

Likewise, when another matrix pattern for conversion (FIG. 13) is furthermore stored in the marker pattern storing unit 22, the marker pattern generating unit 21 takes out this, and converts the data of the identifier. This conversion result is shown in FIG. 14.

Figure 15:
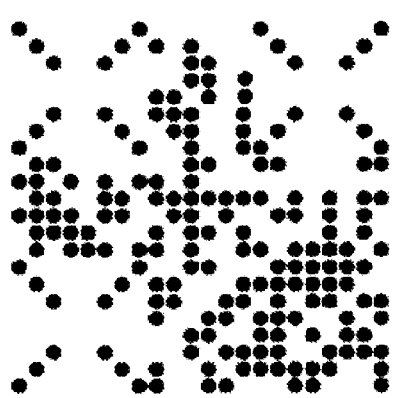
FIG. 15 is a view illustrating the feature points extracted from the identifier shown in FIG. 14.

Next, the marker pattern generating unit 21 extracts the feature points of the identifier subjected to the conversion. These extracted feature points are shown in FIG. 15.

Figure 16:
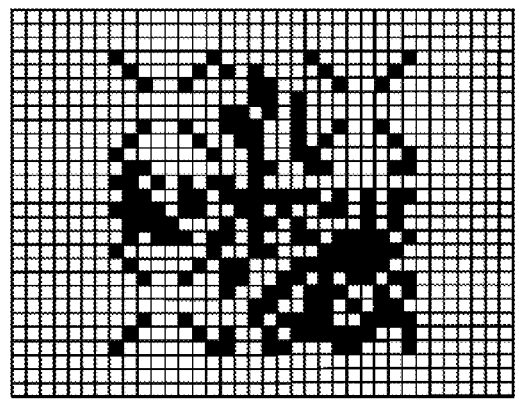
FIG. 16 is a view illustrating the feature space having the feature points shown in FIG. 15 arranged therein.

Continuously, the marker pattern generating unit 21 arranges the extracted feature points in the feature space, and partitions the above feature space into a plurality of the segments, and obtains the number of the arranged feature points for each segment. And, the marker pattern generating unit 21 selects the segments in which the number of the feature points is equal to more than a predetermined number. A situation of this selection is shown in FIG. 16. In the same figure, the segments in which the number of the feature points is "one (1)" or more are displayed in a black color.

And, the marker pattern generating unit 21 generates "the identifier feature information table" containing the coordinates of the segments in which these feature points have been arranged in a predetermined number. The marker pattern generating unit 21 causes the comparison information storing unit 12 and the marker pattern storing unit 22 to store the generated "identifier feature information table".

Figure 17:
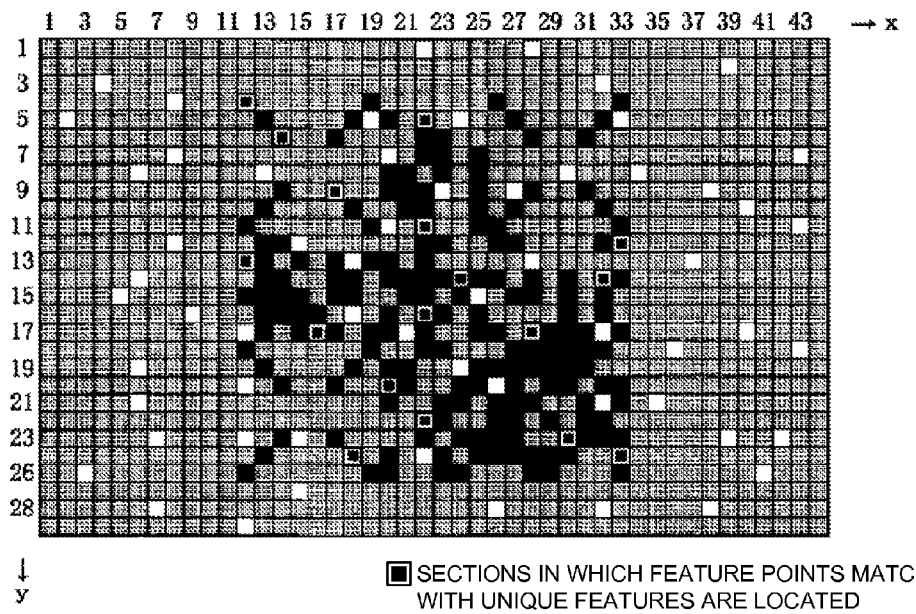
FIG. 17 is a view illustrating the feature space having the feature points of the identifier shown in FIG. 16 and the unique features arranged therein.

This "identifier feature information table" is stored in the comparison information storing unit 12, thereby allowing the feature comparing unit 11 to perform the matching process by making a reference to the above "identifier feature information table". That is, the comparison information storing unit 12 arranges the segments containing the feature points extracted from the identifier subjected to the conversion in the feature space shown in FIG. 7. A situation of this arrangement is shown in FIG. 17. And, the feature comparing unit 11 counts the number of the feature points matching with the unique features, and causes the comparison information storing unit 12 to store this count value. Additionally, the count value is "17" in FIG. 17.

In addition, the marker pattern generating unit 21 selects the identifier having a largest count value, out of the identifier not subjected to the conversion and one identifier subjected to the conversion, or two or more.

Herein, the count value of the identifier not subjected to the conversion is "26" (see FIG. 8). Further, the count value of the identifier converted with the matrix pattern for conversion of FIG. 9(*ii*) is "20" (see FIG. 12). And, the count value of the identifier converted with the matrix pattern for conversion of FIG. 13 is "17" (see FIG. 17). The identifier having a largest count value, out of them, is the identifier not subjected to the conversion. The marker pattern generating unit 21 selects this identifier not subjected to the conversion as the detection marker.

Additionally, when the QR code, being the identifier, is decoded, in a case in which the process is performed only with the single matrix pattern, the QR code may be decoded immediately; however, in a case in which the matrix pattern is selected from among a plurality of the matrix patterns, and the conversion process is performed by employing the selected matrix pattern, it is necessary to determine which matrix pattern for conversion of the cell feature has been used. Hence, classification information of the matrix pattern for conversion of the cell feature used for the process of converting the QR code is desirably incorporated within the QR code as data. With this, the decoding process is capable of simply performing the conversion into the original data cell only by loading in the matrix pattern information used for the conversion process from the QR code, and taking the matrix pattern for conversion of the cell feature corresponding hereto and Exclusive-OR.

(II) Marker Generation Method

Next, an operation of the marker generation device (marker generation method) of this exemplary embodiment will be explained by making a reference FIG. 18.

The same figure is a flowchart illustrating a predetermined procedure of the marker generation method of this exemplary embodiment.

The feature comparing unit 11 of the feature comparing means 10 inputs "the unique feature information table" from the outside. The comparison information storing unit 12 stores the above "unique feature information table" (Step 10).

Further, the feature comparing unit 11 inputs "the identifier feature information table" from the outside or the marker pattern generating means 20. The comparison information storing unit 12 stores the above "identifier feature information table" (Step 11).

The feature comparing unit 11 takes out "the unique feature information table" from the comparison information storing unit 12 (Step 12). Further, the feature comparing unit 11 takes out "the identifier feature information table" from the comparison information storing unit 12 (Step 13).

In addition, the feature comparing unit 11 takes out the coordinates of the unique features from "the unique feature information table". And, the feature comparing unit 11 arranges the unique features in the predetermined space according to the above coordinates.

Further, the feature comparing unit 11 arranges each of the feature points shown in "the serial number of the feature point" of "the identifier feature information table" in the predetermined space according to the x coordinate shown in "the x coordinate of the feature point" and the y coordinate shown in "the y coordinate of the feature point" (Step 14).

Next, the feature comparing unit 11 selects the segments containing the feature points of the identifier matching with the unique features (Step 15).

That is, the feature comparing unit 11 arranges the unique features in the predetermined space, arranges the segments containing the feature points of the identifier, and selects the segments matching with the unique features, out of the segments containing these feature points.

And, the feature comparing unit 11 counts the number of the segments containing the feature points of the identifier matching with the unique features (Step 16). The comparison information storing unit 12 stores the above count number.

When the count value is stored in the comparison information storing unit 12, the marker pattern generating unit 21 of the marker pattern generating means 20 determines whether or not the matrix pattern for conversion has been stored in the marker pattern storing unit 22 (Step 17).

When the matrix pattern for conversion has been stored as a result of determination, the marker pattern generating unit 21 takes out the above the matrix pattern for conversion from the marker pattern storing unit 22, and converts the arrangement pattern of the data displayed in the data region of the identifier by employing this matrix pattern for conversion (a process of converting the identifier, Step 18).

On the other hand, when the matrix pattern for conversion has not been stored, the marker pattern generating unit 21 does not perform the conversion process of the identifier. At this time, the operation proceeds to Step 21.

When the marker pattern generating unit 21 performs the conversion process of the identifier, it extracts the feature points from the identifier subjected to the conversion, generates "the identifier feature information table" related to these feature points, and causes the comparison information storing unit 12 and the marker pattern storing unit 22 to store it (Step 19).

Continuously, the feature comparing unit 11 determines whether or not "the identifier feature information table" not subjected to the processes of the Step 14 to the Step 16 has been stored in the comparison information storing unit 12, that is, determines whether or not "the identifier feature information table" newly generated by the marker pattern generating unit 21 has been stored in the comparison information storing unit 12 (Step 20).

When "the identifier feature information table" has been stored as a result of determination, the feature comparing unit 11 takes out the above "identifier feature information table" from the comparison information storing unit 12, and performs the processes of the Step 14 to the Step 16.

On the other hand, when "the identifier feature information table" has not been stored, the feature comparing unit 11 selects the identifier with the pattern of which the number of the feature points matching with the unique features is most numerous as the detection marker (Step 21).

With such a method, the feature comparing unit 11 can select the pattern of the identifier that is optimum when used as the detection marker.

As explained above, the marker generation device and the marker generation method of this exemplary embodiment were configured to extract, for each data arrangement pattern of the identifier, respective feature points, to arrange these feature points in the predetermined space, and to define the identifier with the data arrangement pattern of which the number of the feature points matching with the unique features was most numerous as the detection marker. This makes it possible to select the optimum identifier as the detection marker.

Additionally, while the feature points based upon the identifier alone were displayed in the identifier feature information table shown in FIG. 4 and the feature spaces shown in FIG. 5, FIG. 6, and FIG. 8, the feature points are not limited to the feature points based upon the identifier alone, and for example, it is also possible to extract the feature points from the background containing the identifier, to prepare the identifier feature information table about these feature points, to arrange the feature points in the feature space, and to compare the above feature points with the unique features.

Further, while the QR code was listed as an example of the identifier in the exemplary embodiment, the identifier is not limited to the QR code, and could be an identifier obtained by encoding the data according to a predetermined rule (program).

The Second Exemplary Embodiment

Next, the second exemplary embodiment of the marker generation device and the marker generation method of the present invention will be explained by making a reference to FIG. 19.

The same figure is a block diagram illustrating a configuration of the marker generation device of this exemplary embodiment.

This exemplary embodiment, as compared with the first embodiment, differs in a point of newly including a video image inputting means and a feature extracting means. Other components are similar to those of the first exemplary embodiment.

Figure 19:
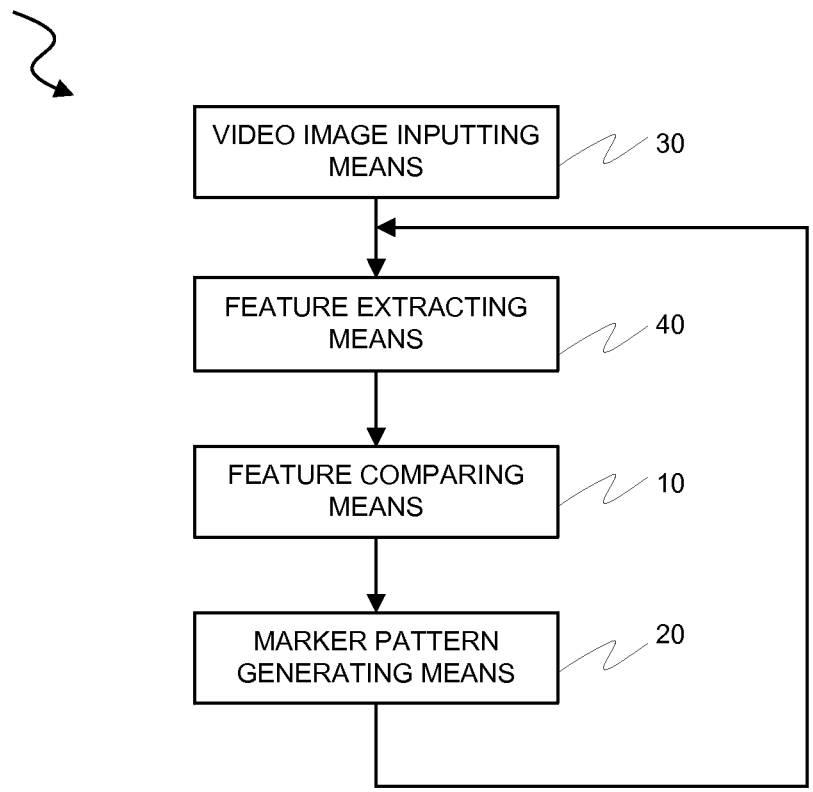
FIG. 19 is a block diagram illustrating a configuration of the marker generation device in a second exemplary embodiment of the present invention.

Thus, in FIG. 19, identical codes are added to the component parts similar to those of FIG. 1, and its detailed explanation is omitted.

(I) Marker Generation Device

As shown in FIG. 19, a marker generation device 1b is provided with a feature comparing means 10, a marker pattern generating means 20, a video image inputting means 30, and a feature extracting means 40.

Figure 20:
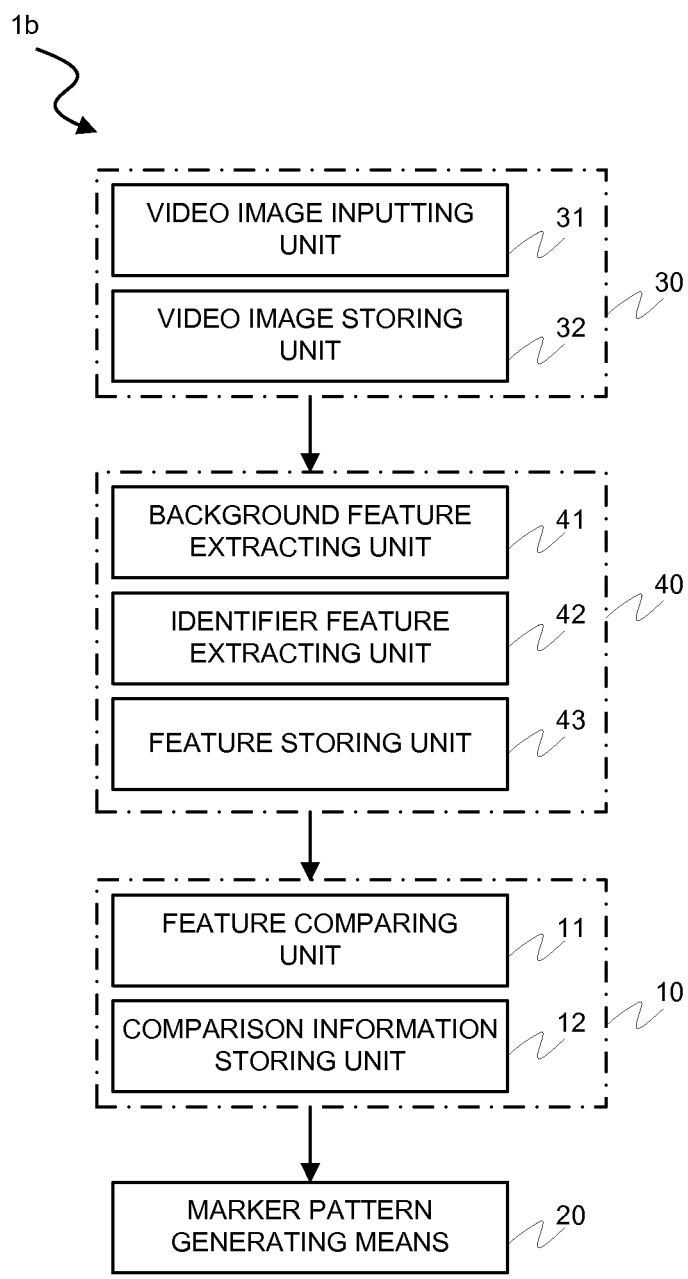
FIG. 20 is a block diagram illustrating a detailed configuration of the marker generation device in the second exemplary embodiment of the present invention.

Herein, the video image inputting means 30 includes a video image inputting unit 31 and a video image storing unit 32 as shown in FIG. 20.

The video image inputting unit 31 images or inputs the background video image.

The background video image is a video image obtained by imaging the environment in which the identifier (the identifier from which the data arrangement pattern to be used as the detection marker is to be selected), being a determination target, does not exist. For example, when a belt-conveyer for transporting the object exists, the above background video image is equivalent to a video image obtained by imaging the belt-conveyer in the situation of transporting the object not added with the identifier, being a determination target thereof, and its neighbor, or the like.

The above background video image could be a moving image (video image), and further, could be plural pieces of the still images taken at a predetermined time interval.

In addition, the above background video image may include a live video image, a recorded video image, a delivered video image, or the like.

Further, the video image inputting unit 31 may image the identifier, being a determination target, in a single unit (by employing a blue back and the like). This imaged video image is referred to as an identifier-only video image.

In addition, the video image inputting unit 31 may image the environment in which the identifier, being a determination target, exists. This imaged video image is referred to as an identifier environment video image.

Further, the video image inputting unit 31 may include the imaging device for itself. In this case, the video image inputting unit 31 may image the situation adjacent the location in which the corresponding marker generation device 1b has been mounted as the background video image.

In addition, the video image inputting unit 31 also may input the background video images incorporated by devices other than the corresponding marker generation device 1b via a communication network, a communication cable or the like.

Figure 21:
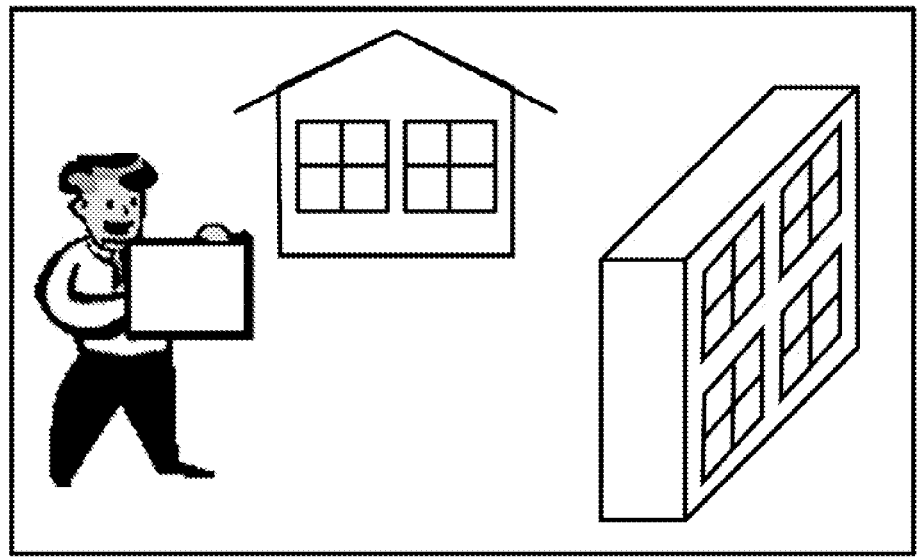
FIG. 21 is a view illustrating an example of the background video image.

An example of the background video image inputted by this video image inputting unit 31 is shown in FIG. 21.

The video image storing unit 32 stores the still image frames constituting the background video image as digitized frame images. The so-called still image frame constituting the background video image, when the image as shown in FIG. 21 exists in a plural number, points to each piece of these images, for example.

Further, the video image storing unit 32 stores the number added to each of a plurality of the frame images (for example, serial number).

In addition, the video image storing unit 32 may also store information specifying a time when the frame image was taken, a device that imaged the frame image, and the like (in a case where the frame image was inputted from the outside).

The feature extracting means 40, as shown in FIG. 20, includes a background feature extracting unit 41, an identifier feature extracting unit 42, and a feature storing unit 43.

The background feature extracting unit 41 takes out the frame images from the video image storing unit 32. And, the background feature extracting unit 41 extracts the image features containing characteristic patterns within the taken-out frame images.

The background feature extracting unit 41 may use, for example, a graphically distinctive property in the form of numeric values as the image feature.

Figure 22:
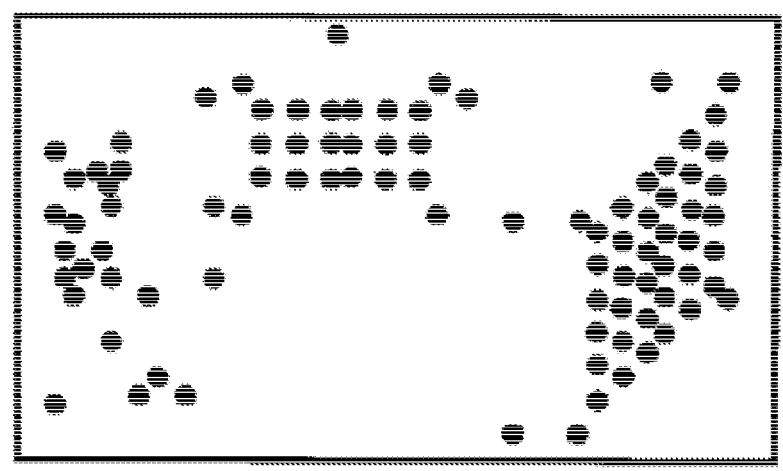
FIG. 22 is a view illustrating the feature space having the feature points arranged therein.

For example, the method disclosed by T. Tommasini, et al. in "Making good features track better" presented in Proceedings of IEEE International Conference on Computer Vision and Pattern Recognition (1998) may be used therefor. This method is capable of extracting vertices of a shape of the object, intersections of linear objects, endpoints, etc. in the image. And, a series of position coordinate information of these points on the image may be defined as graphical features. For example, upon extracting the feature points for the frame image of FIG. 21 with this method, the feature points are arranged in plural number as shown in FIG. 22. The feature points may be managed with the coordinates on a one-by-one basis.

Additionally, the space having the feature points arranged therein is called a feature space. This feature space may be two-dimensional or may be three-dimensional. The feature space of this exemplary embodiment is assumed to be two-dimensional.

Further, as another method, there exists, for example, the method disclosed by Montanari in "On the option detection of curves in noisy pictures," Communications of ACM, 14, 1971. According to this, entries in an R table in which a distance from a reference point and a relative angle are stored may be used as the features. At this moment, by defining the reference point for all feature positions and exhaustively extracting the features, the marker may be made robust against partial loss of the features.

In addition, as another method of extracting the features, for example, there exists the method of using a luminance value or a color difference value of each pixel on the image as the feature.

Figure 23:
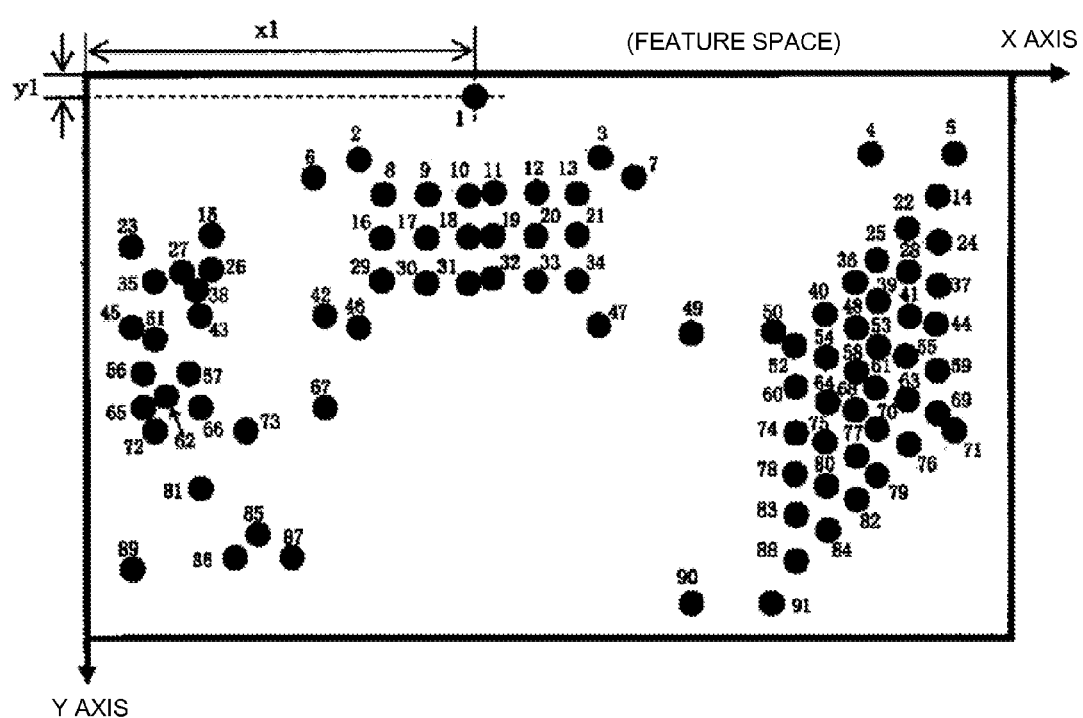
FIG. 23 is a view illustrating the feature space in which the feature points added with the numbers have been arranged.

Next, the background feature extracting unit 41 adds the serial number to each of the feature points as shown in FIG. 23. This serial number may be added in the descending order of the feature point, to being with the highest-ranked feature point, in such a manner of t1, t2, t3, t4, . . . .

Continuously, the background feature extracting unit 41 obtains respective coordinates of the feature points. For the coordinates, as shown in FIG. 23, an X axis and a Y axis may be set in the feature space to define a distance from the Y axis and a distance from the X axis as an X coordinate and a Y coordinate, respectively.

And, the background feature extracting unit 41 causes the feature storing unit 43 to store the serial numbers and the coordinates of these feature points. The feature storing unit 43 may store these serial numbers and the like as "the feature point information table" as shown in FIG. 24.

"The feature point information table", as shown in the same figure, may include "the serial number of the frame image" (A), "the serial number of the feature point" (B), "the x coordinate of the feature point" (C), and "the y coordinate of the feature point" (D) as an item, respectively.

"The serial number of the frame image" is indicative of the number added to the frame image from which the feature points have been extracted.

"The serial number of the feature point" is indicative of the number added to each of a plurality of the feature points. Specifically, "t1" and "t15" of FIG. 23, and the like fall under it.

"The x coordinate of the feature point" is indicative of an x coordinate of the above feature point in the feature space.

"The y coordinate of the feature point" is indicative of a y coordinate of the above feature point in the feature space.

Figure 25:
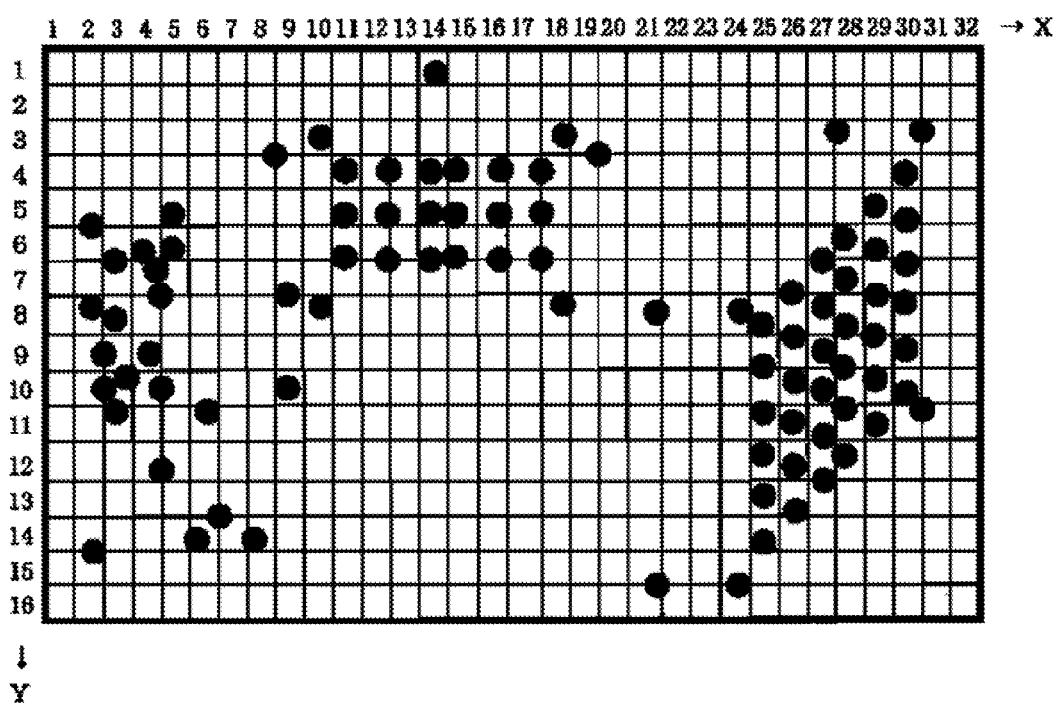
FIG. 25 is a view illustrating the feature space in which the segment lines are drawn.

Next, the background feature extracting unit 41 divides the feature space into a plurality of segments by using grid-shape mesh cells as shown in FIG. 25.

At this moment, the background feature extracting unit 41 calculates the coordinate of each segment. This coordinate of each segment may be displayed by coordinates of lines for separating each segment (segment lines).

Figure 26:
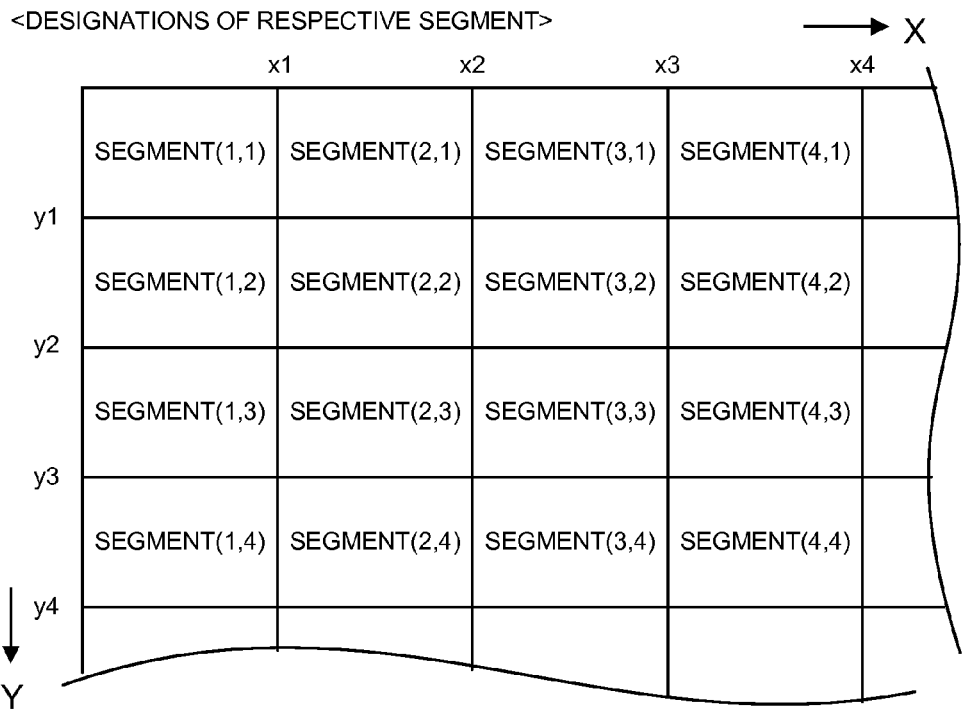
FIG. 26 is a view illustrating designations of the segments.

For example, as shown in FIG. 26, it is assumed that the coordinates of the separating lines are defined as x1, x2, x3, . . . , y1, y2, y3, . . . .

Further, designations of respective segment are defined as segment (1,1), segment (1,2), segment (1,3), . . . , segment (2,1), segment (2,2), segment (2,3), . . . . Segment (1,1), out of them, is a scope encircled by the coordinate (0,0)-(x1,0)-(x1, y1)-(0,y1)-(0,0).

Herein, x1 is an x coordinate of the first-place segment line in the X direction. Further, y1 is a y coordinate of the first-place segment line in the Y direction. With this, the coordinate of segment (1,1) may be displayed as (x1,y1) as shown in FIG. 27.

Likewise, the coordinate of segment (2,1), the coordinate of segment (3,1), the coordinate of segment (1,2), and the coordinate of segment (2,2) may be displayed as (x2,y1), (x3,y1), (x1,y2), and (x2,y2), respectively.

Figure 27:
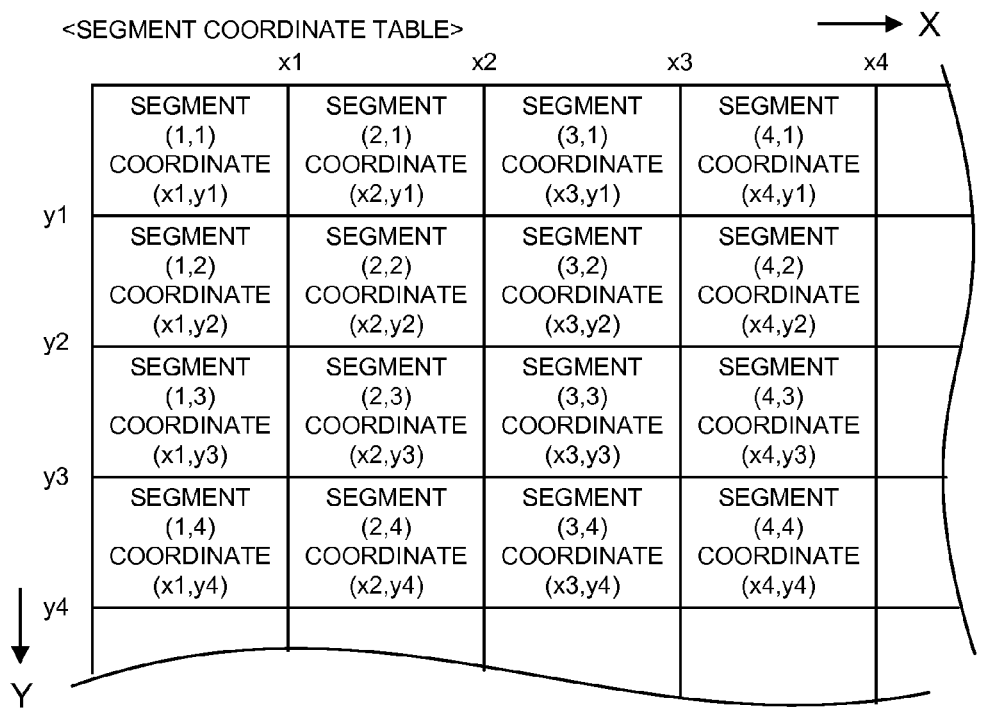
FIG. 27 is a view illustrating the coordinates of the segments.

A relationship between the designation and the coordinate of each segment is shown in FIG. 27. The background feature extracting unit 41 may cause the feature storing unit 43 to store these designations and the coordinates of respective segments as a segment coordinate table.

Further, size of one segment may be arbitrarily set. However, size of one segment is desirably decided in such a manner that at least two segments or more in which no feature point exists exist within the feature space.

Continuously, the background feature extracting unit 41 obtains the number of the feature points for each segment.

This calculation of the number of the by-segment feature points may be performed by employing the coordinate of each segment and the coordinate of each feature point.

Figure 28:
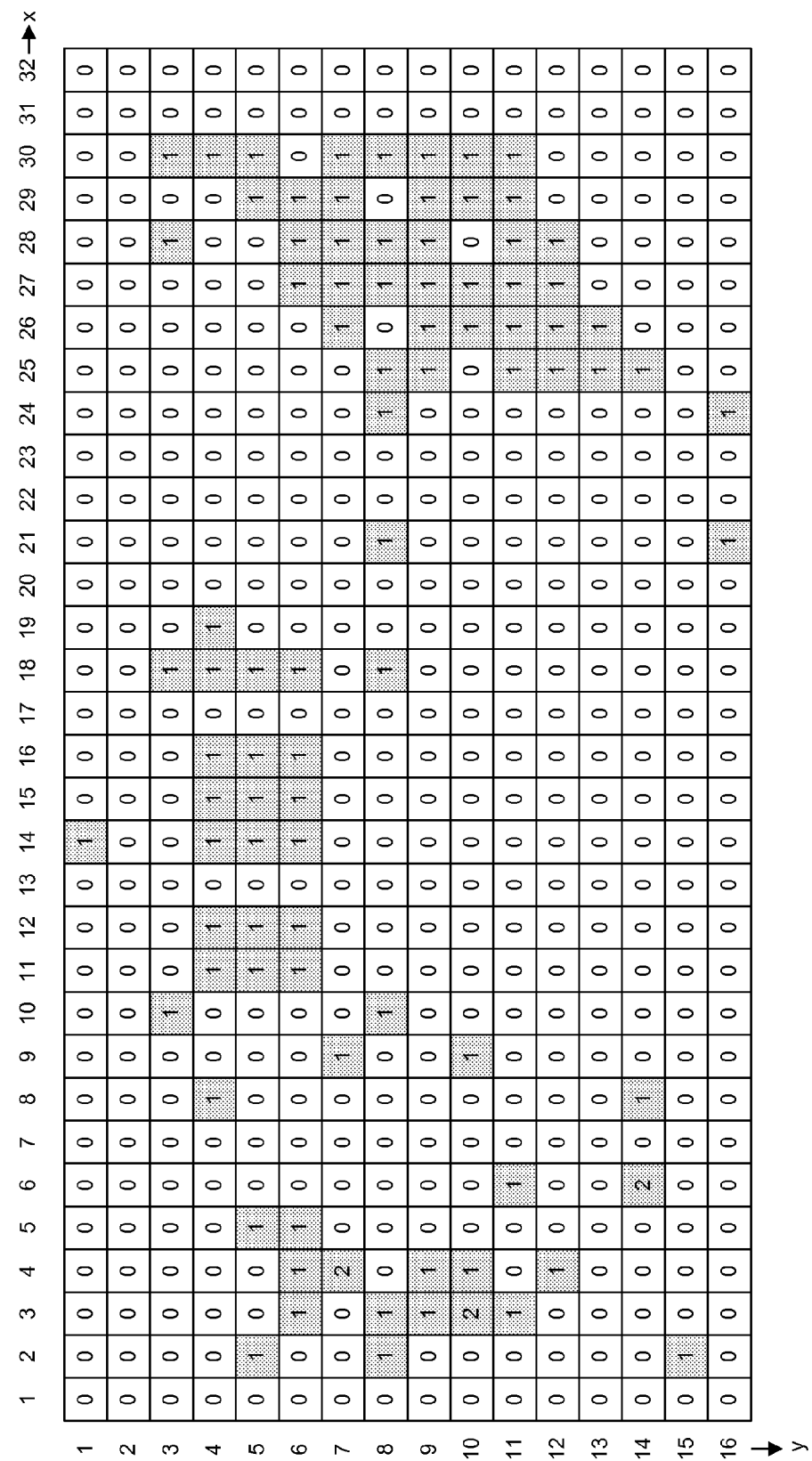
FIG. 28 is a chart illustrating a configuration of a feature point number distribution diagram (frequency distribution).

The calculated numbers of the by-segment feature points, as shown in FIG. 28, may be displayed as a feature point number distribution diagram (frequency distribution). This "feature point number distribution diagram" is stored in the feature storing unit 43.

Additionally, in FIG. 28, so as to make the explanation easily understandable, the segments in which one feature point or more exists are shaded in a gray color.

Further, the background feature extracting unit 41 selects the segments in which the number of the feature points is zero, or is equal to or less than a predetermined number as the unique features. For example, the background feature extracting unit 41 selects (x1,y1), (x2,y1), (x3,y1) and the like as the unique features in the feature point number distribution diagram shown in FIG. 28.

And, the feature extracting unit 21 prepares "the unique feature information table" indicative of the coordinates of the selected unique features (see FIG. 3). The feature extracting unit 21 causes the feature storing unit 12 to store this "unique feature information table"

The identifier feature extracting unit 42 extracts the feature points based upon the video image of the identifier inputted or imaged by the video image inputting unit 31.

For example, it is assumed that the above inputted identifier has an arrangement of the data as shown in FIG. 9(i). The identifier feature extracting unit 42 extracts the feature points from the above identifier. The method of this extraction is identical to the extraction method to be executed by the background feature extracting unit 41.

Figure 29:
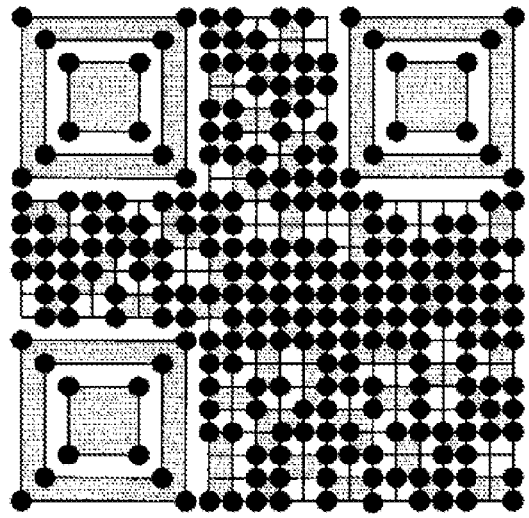
FIG. 29 is s a view illustrating a situation in which the feature points are extracted from the identifier.

The feature points extracted by the identifier feature extracting unit 42 from the identifier shown in FIG. 20 are displayed as shown in FIG. 29.

Figure 30:
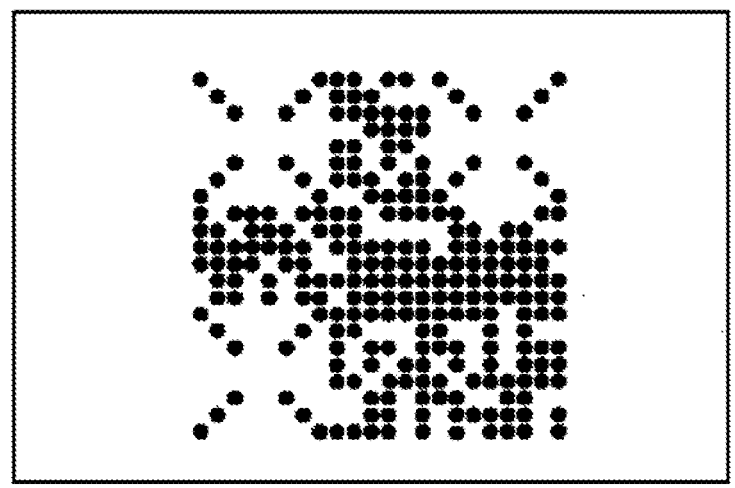
FIG. 30 is a view illustrating the feature space having the feature points arranged therein.

Further, the identifier feature extracting unit 42 arranges the extracted feature points in the feature space. The feature space having these feature points arranged therein is shown in FIG. 30.

And, the identifier feature extracting unit 42 calculates the coordinate of each feature point in the feature space. The identifier feature extracting unit 42 puts together these calculated coordinates of the feature points as "the identifier feature information table"(see FIG. 4). This "identifier feature information table" is stored in the feature storing unit 43.

The feature storing unit 43 stores "the feature point information table", "the segment coordinate table", and "the feature point number distribution diagram".

The feature comparing means 10 includes a feature comparing unit 11 and a comparison information storing unit 12 as shown in FIG. 20.

The feature comparing unit 11 arranges the feature points shown in "the identifier feature information table" in the feature space. Further, the feature comparing unit 11 divides the feature space having the feature points of the identifier arranged therein into a plurality of the segments by adding the segment lines hereto. In addition, the feature comparing unit 11 specifies the segments in which the number of the feature points is equal to or more than a predetermined number ("1" in this exemplary embodiment). These specified segments are shown in FIG. 6. In the same figure, the segments filled-in in black are segments in which the number of the feature points is equal to or more than the predetermined number.

Further, the feature comparing unit 11 arranges the unique features shown in "the unique feature information table" in the feature space. In addition, the feature comparing unit 11 arranges the segments containing the feature points of the identifier in the above feature space. A situation of this arrangement is shown in FIG. 8.

In the same figure, the segments with a white color are indicative of segments having the unique features arranged therein, the segments with a gray color are indicative of segments having no unique feature arranged therein, the segments with a black color are indicative of segments having the feature points of the identifier arranged therein, and the segments with a double-square symbol are indicative of the segments in which the segment containing the feature points and the unique feature have been superposed upon each other.

Further, the feature comparing unit 11 selects the feature points of the identifier matching with the unique features.

In the same figure, the segments indicated by the double-square symbol fall under it. The feature comparing unit 11 counts the number of the above segments. The number thereof is 26 in the same figure.

The comparison information storing unit 12 stores the count number.

The marker pattern generating means 20 performs a process similar to the process that the marker pattern generating means 20 of the first exemplary embodiment performs.

(II) Marker Generation Method

Next, an operational procedure of the marker generation device (marker generation method) will be explained by making a reference FIG. 31.

Figure 31:
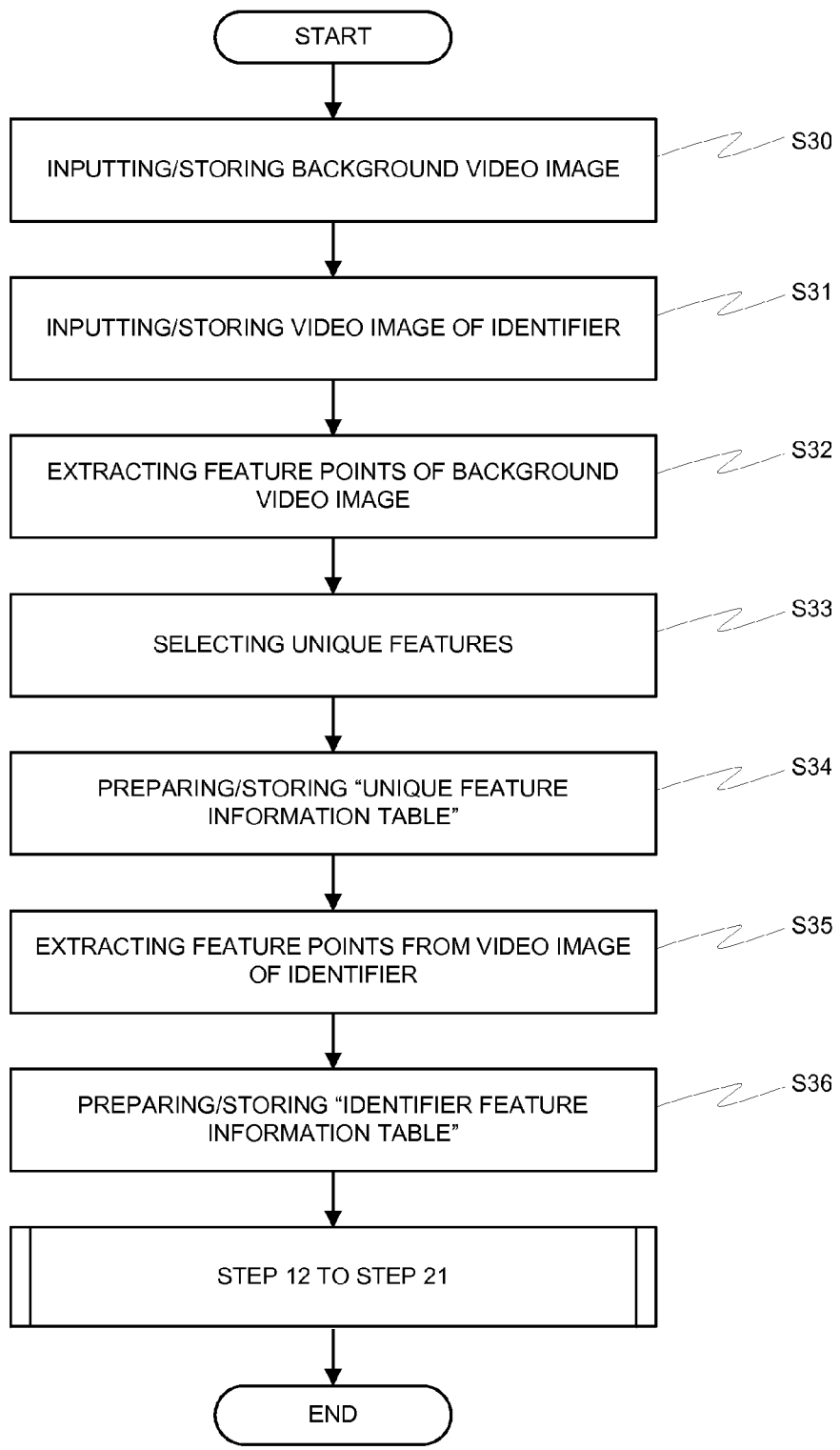
FIG. 31 is a flowchart illustrating an operation of the marker generation device in the second exemplary embodiment of the present invention.

FIG. 31 is a flowchart illustrating a processing procedure of the marker generation method.

In the marker generation device 1b, the video image inputting unit 31 of the video image inputting means 30 images (or inputs) the background video image (Step 30). This background video image may be configured of plural pieces of the frame images. The video image storing unit 32 of the video image inputting means 30 stores the background video image inputted by the video image inputting unit 31 as the frame image.

Further, the video image inputting unit 31 images (or inputs) the identifier, being a determination target, as the video image (Step 31). The video image storing unit 32 stores the video image of the identifier inputted by the video image inputting unit 31.

The background feature extracting unit 41 of the feature extracting means 40 takes out the frame images from the video image storing unit 32, and extracts the feature points from these frame images (Step 32).

Further, the background feature extracting unit 41 arranges these feature points in the feature space. And, the background feature extracting unit 41 calculates the coordinates of the feature points in the feature space. These calculated coordinates are put together into "the feature point information table", and stored in the feature storing unit 43.

Next, the background feature extracting unit 41 divides the feature space into a plurality of segments by using grid-shape mesh cells. Continuously, the background feature extracting unit 41 obtains the number of the feature points for each segment, and selects the segments in which the number of the feature points is zero, or equal to or less than a predetermined number as the unique features (Step 33).

And, the background feature extracting unit 41 prepares "the unique feature information table" indicative of the coordinates of the selected unique features. The comparison information storing unit 12 of the feature comparing means 10 stores "the unique feature information table" (Step 34).

The identifier feature extracting unit 42 of the feature extracting means 40 takes out the image of the identifier from the video image storing unit 32, and extracts the feature points from this image of the identifier (Step 35).

Further, the identifier feature extracting unit 42 arranges these feature points in the feature space. And, the identifier feature extracting unit 42 calculates the coordinates of the feature points in the feature space. These calculated coordinates are put together into "the identifier feature information table", and stored in the comparison information storing unit 12 of the feature comparing means 10.

Figure 18:
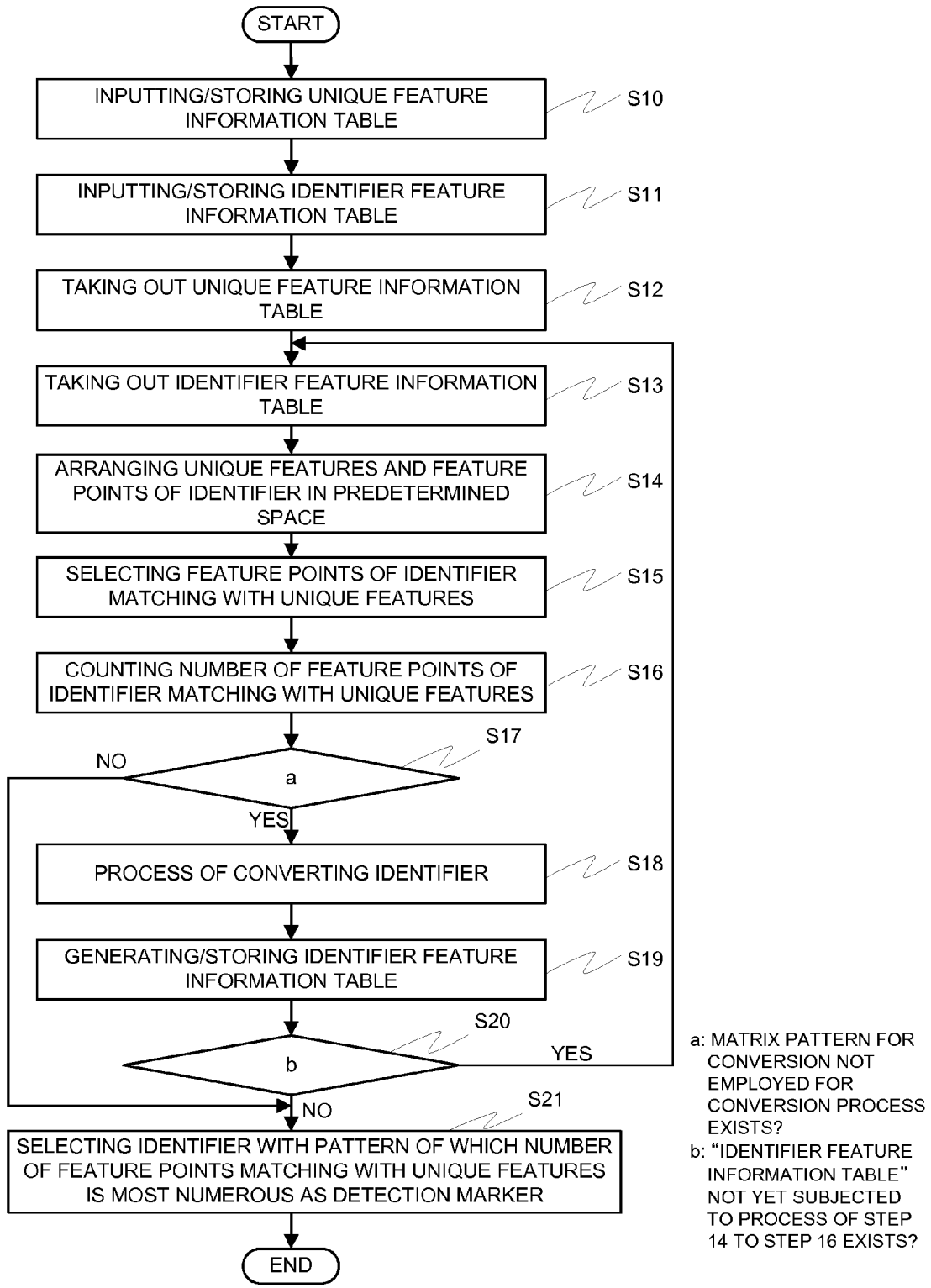
FIG. 18 is a flowchart illustrating an operation of the marker generation device in the first exemplary embodiment of the present invention.

The process subsequent hereto is similar to that of the Step 12 to the Step 21 of FIG. 18.

As explained above, the marker generation device and the marker generation method of this exemplary embodiment were configured to extract the feature points from the identifier, being a determination target, to arrange these feature points in the feature space, to count the number of the feature points matching with the unique features, to convert the data arrangement pattern of the identifier, to count the number of the feature points matching with the unique features whenever performing this conversion, and to select the identifier having a largest count value as the detection marker. This makes it possible to select the optimum identifier as the detection marker.

Additionally, while FIG. 29 illustrates the feature points extracted from the identifier, and FIG. 30 illustrates the feature space having the above feature points arrange therein, the extraction of the feature points is not limited to the extraction from the identifier alone, and for example, it is also possible to extract the feature points from the background containing the identifier. In this case, the identifier feature information table about the feature points extracted from these identifier and background is prepared, these feature points are arranged in the feature space, and a determination as to whether or not the feature points match with the unique features is made. When the number of the feature points matching with the unique features is equal to more than a predetermined number as a result of the determination, it may be determined that the above identifier can be used as the detection marker.

Further, while the QR code was listed as an example of the identifier in this exemplary embodiment, the identifier is not limited to the QR code, and could be identifier obtained by encoding the data according to a predetermined rule (program).

The Third Exemplary Embodiment

Next, the third exemplary embodiment of the marker generation device and the marker generation method of the present invention will be explained by making a reference to FIG. 32.

The same figure is a block diagram illustrating a configuration of the marker generation device of this exemplary embodiment.

This exemplary embodiment, as compared with the first embodiment, differs in a point of newly including a video image inputting means, a feature extracting means, and an invariant feature converting means. Other components are similar to those of the first exemplary embodiment.

Figure 32:
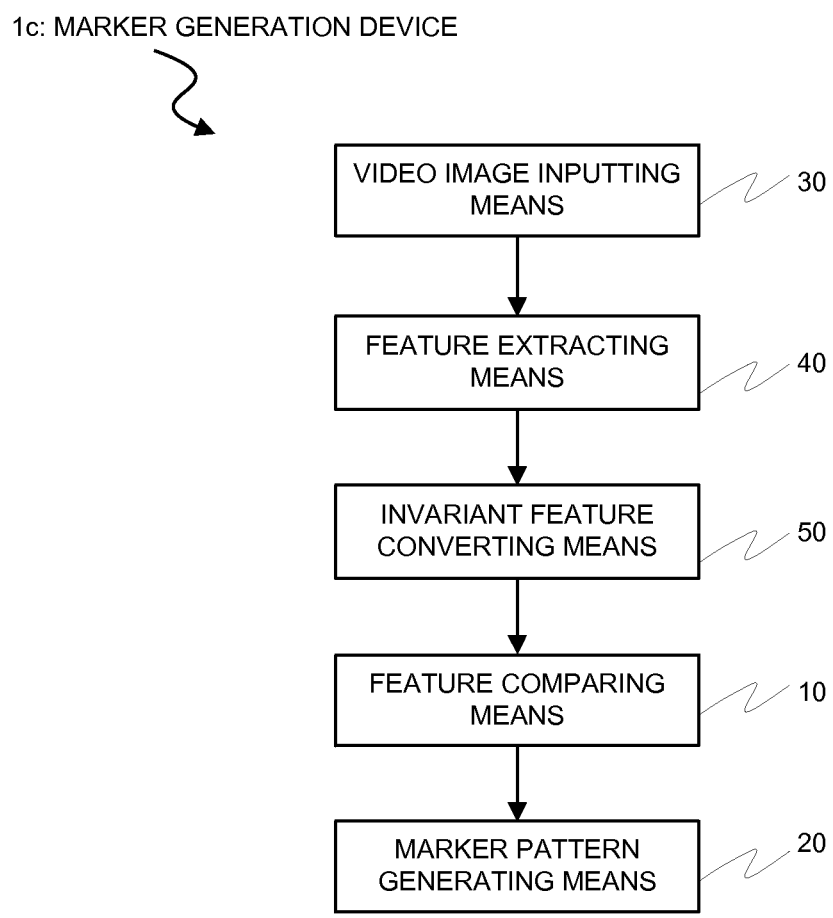
FIG. 32 is a block diagram illustrating a configuration of the marker generation device in a third exemplary embodiment of the present invention.

Thus, in FIG. 32, identical codes are added to the component parts similar to those of FIG. 1, and its detailed explanation is omitted.

(I) Marker Generation Device

As shown in FIG. 32, a marker generation device 1c is provided with a feature comparing means 10, a marker pattern generating means 20, a video image inputting means 30, a feature extracting means 40, and an invariant feature converting means 50.

Figure 33:
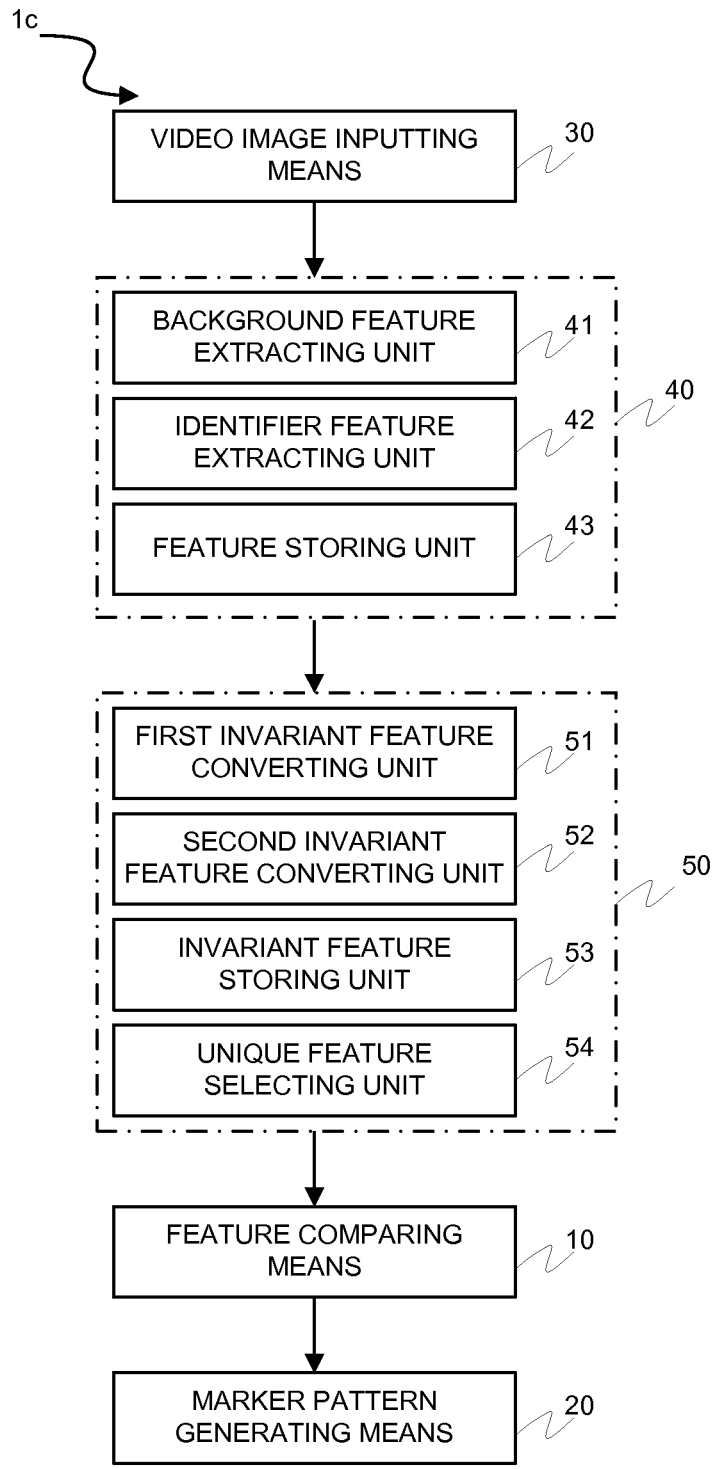
FIG. 33 is a block diagram illustrating a detailed configuration of the marker generation device in the third exemplary embodiment of the present invention.

Herein, the feature extracting means 40 includes a background feature extracting unit 41, an identifier feature extracting unit 42, and a feature storing unit 43 as shown in FIG. 33.

The background feature extracting unit 41 takes out the frame image from the video image storing unit 32, and extracting the image features containing the characteristic pattern within this frame image.

Next, the background feature extracting unit 41 adds the serial number to each of the feature points as shown in FIG. 23. Continuously, the background feature extracting unit 41 obtains the coordinate of each feature point.

And, the background feature extracting unit 41 puts together these serial numbers and coordinates of the feature points as "the feature point information table" and causes the feature storing unit 43 to store it.

The identifier feature extracting unit 42 extracts the feature points based upon the video image of the identifier inputted by the video image inputting unit 31. Further, the identifier feature extracting unit 42 arranges the extracted feature points in the feature space.

The feature space having these feature points arranged therein is one shown in FIG. 5, for example.

In addition, the identifier feature extracting unit 42 calculates the coordinate of each feature point in the feature space. The identifier feature extracting unit 42 puts together these calculated coordinates of the feature points into "the identifier feature information table" (see FIG. 4). This "identifier feature information table" is stored in the comparison information storing unit 12 of the feature comparing means 10.

The feature storing unit 43 stores "the feature point information table".

The invariant feature converting means 50, as shown in FIG. 33, includes a first invariant feature converting unit 51, a second invariant feature converting unit 52, an invariant feature storing unit 53, and a unique feature selecting unit 54.

The first invariant feature converting unit 51 converts the feature points into the invariant features. This first invariant feature converting unit 51 takes out "the feature point information table" from the feature storing unit 43 of the feature extracting means 40, converts the feature points thereof into the invariant features, and causes the invariant feature storing unit 53 to store them.

With the case of extracting a distinctive segment in an image and defining a series of position coordinate information on the above image as a graphical feature (for example, with the case of a process of extracting the feature points shown in FIG. 22 from the background video image shown in FIG. 21), conversion thereof into the invariant feature may conducted in a manner as described below, for example. For convenience, the series of the position coordinate information are referred to as feature point groups herein. For simplification, a geometrical invariant feature in a faraway background will be explained. However, consideration should be given so that a feature quantity is invariant even when an effect of optical distortion may cause shear deformative distortion in the image. However, it is easy to extend the invariant feature to that having a higher freedom degree in a case in which the background is not faraway, or the like. One exemplary method of generating a geometrical invariant feature from the positional relationship between the feature point groups will be explained, wherein the geometrical invariant feature is a feature quantity that is invariable irrespective of a change in the relative positional relationship resulting in the shear deformative distortion when a camera and a scene, being a to-be-imaged target, are rotated and translated relative to each other.

Three arbitrary feature points are selected from the feature point groups. On the other hand, the invariant feature space is defined as a two-dimensional plane spanned by two orthogonal axes. One of the feature points selected from the feature point groups is caused to correspond to an origin in the invariant feature space. Two other points are caused to correspond to position coordinates (1,0) and (0,1) in the invariant feature space, respectively. These three points are referred to as bases hereinbelow. At that time, a one-to-one linear map from the original space to the invariant feature space may be defined as an affine transform. All feature point groups except the bases are mapped onto the invariant feature space by employing the same affine transform characterized by the bases, whereupon these feature point groups are invariant irrespective of the relative positional relationship between the camera and the scene. In practice, however, it is necessary to select the bases from all permutations and combinations of three of the feature point groups, and map non-basis feature points with respect to each basis onto the invariant feature space because not always the identical bases can be selected from the scenes.

All bases created in such a manner and the maps of all feature points onto the invariant feature space are stored in the invariant feature storing unit 53 as the invariant features. The reason why these feature point groups are invariant against the geometrical deformation is that the bases selected from the marker allow the resulting invariant feature to match in the video image containing other objects at any time.

While the technique of defining the number of the bases as three was explained until this, the number of the bases is not limited to three, and the number of the bases could be 1, 2, or four or more. Next, the technique of defining the number of the bases as one (1) will be explained.

It is assumed that the feature points extracted from a certain frame image, as shown in FIG. 22, are arranged in the feature space. Further, it is assumed that the serial number is added to each feature point as shown in FIG. 23.

The first invariant feature converting unit 51 decides one feature point as the basis, moves this feature point so that it comes to a location of coordinate (0,0) on the invariant feature space, obtains this movement amount, and moves all other feature points as well to the invariant feature space by the above movement amount.

Figure 34:
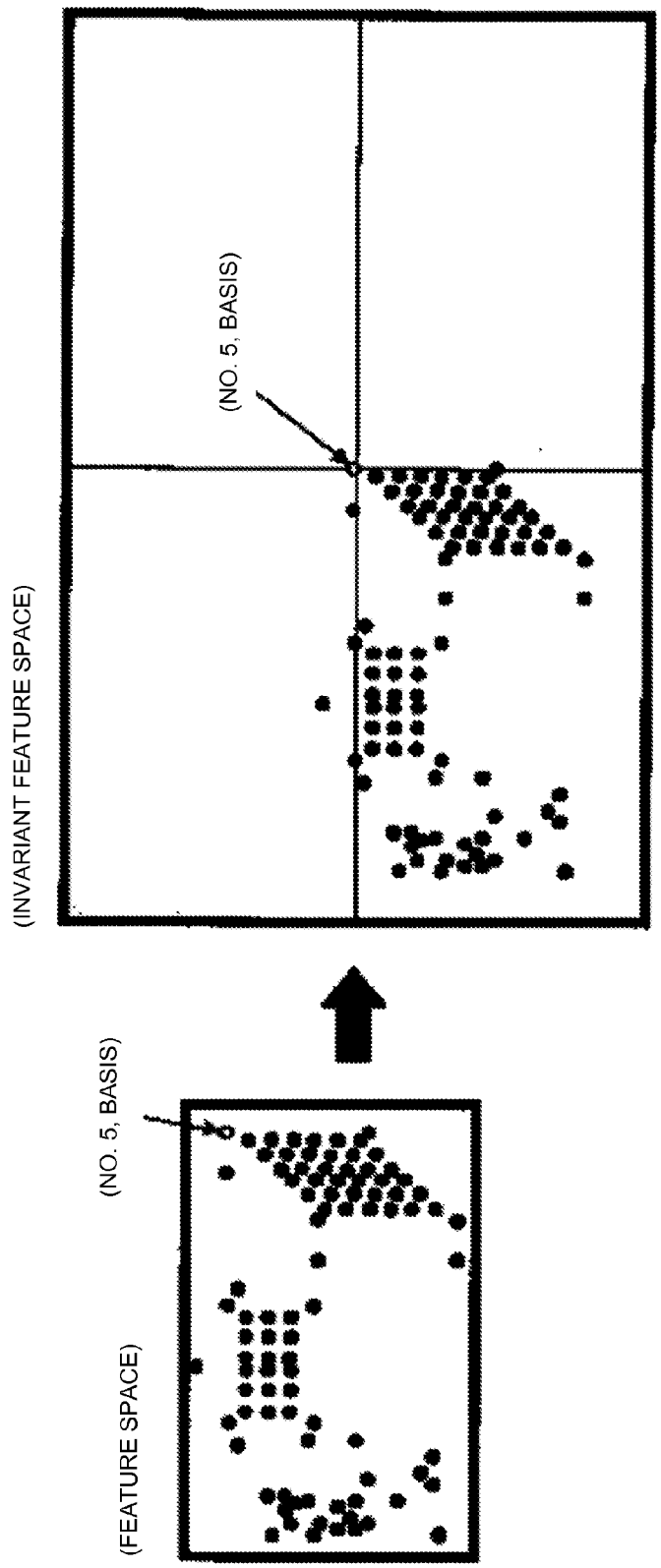
FIG. 34 is a view illustrating a situation in which respective feature points are mapped onto the invariant feature space with a feature point No. 5 defined as a basis.

For example, as shown in FIG. 34, the invariant feature converting unit 51 defines the feature point with the serial No. 5 as the basis, and translates all feature points so that this feature point with No. 5 comes to a location of coordinate (0, 0) in the invariant feature space. This allows the feature points to be arranged in the invariant feature space as shown in the right of the same figure. Additionally, the feature point arranged in the invariant feature space is referred to as an invariant feature.

Figure 35:
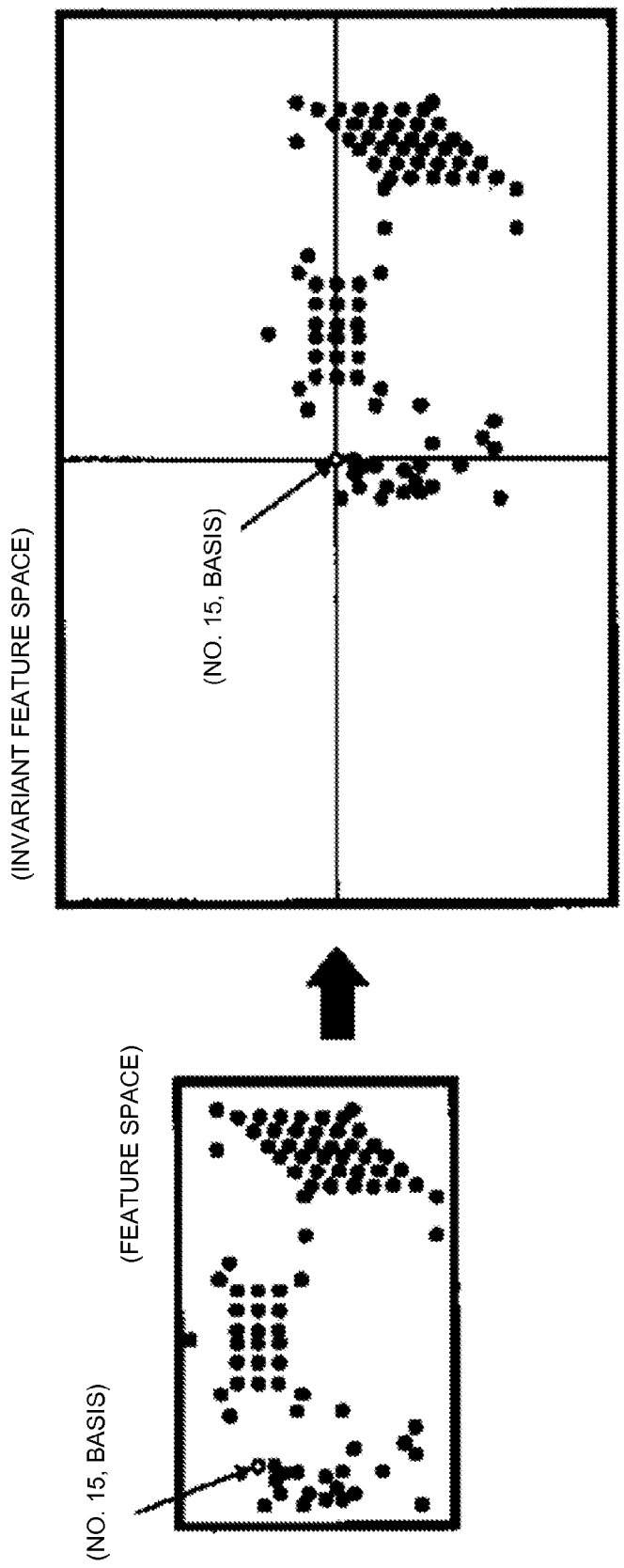
FIG. 35 is a view illustrating a situation in which respective feature points are mapped onto the invariant feature space with a feature point No. 15 defined as a basis.

Further, as shown in FIG. 35, when the invariant feature converting unit 51 defines the feature point with serial No. 15 as the basis, and translates all feature points so that the feature point with No. 15 comes to a location of coordinate (0, 0) in the invariant feature space, the invariant feature group is arranged as shown in the invariant feature space of the right of the same figure.

Figure 36:
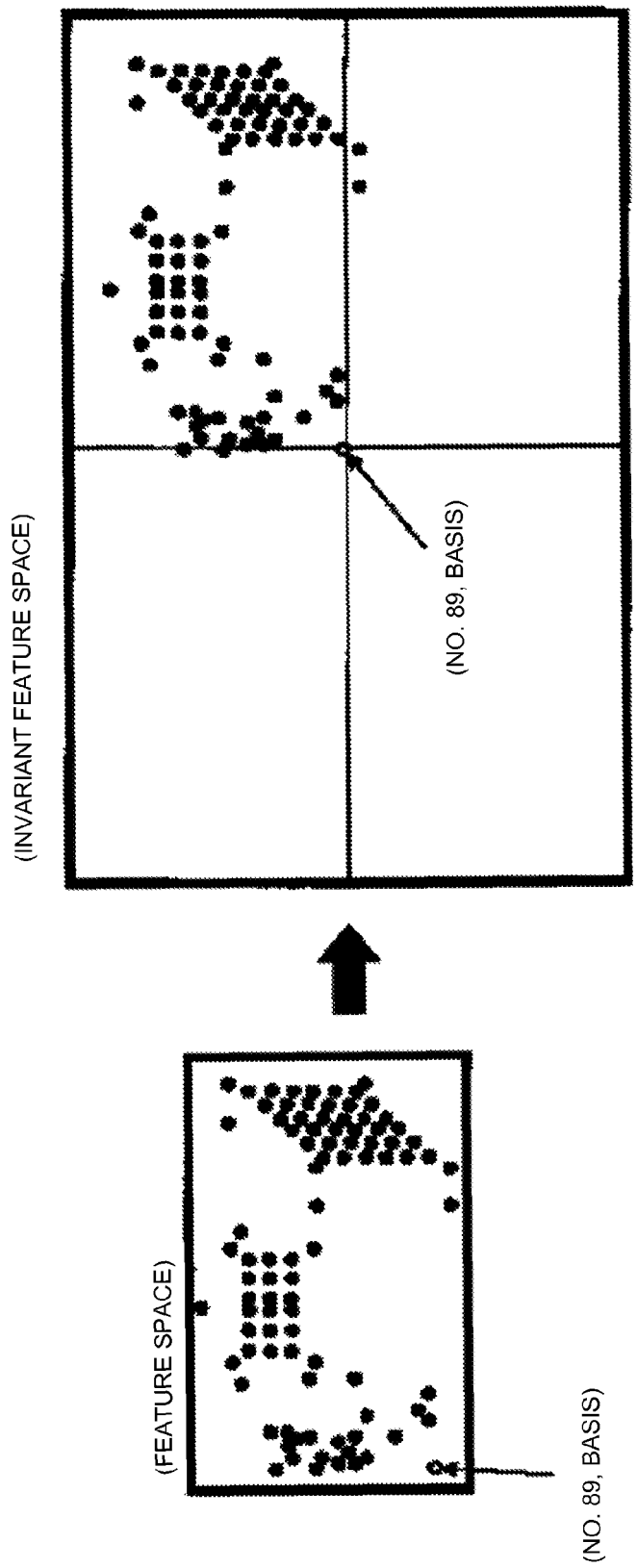
FIG. 36 is a view illustrating a situation in which respective feature points are mapped onto the invariant feature space with a feature point No. 89 defined as a basis.

In addition, as shown in FIG. 36, when the invariant feature converting unit 51 defines the feature point with serial No. 89 as the basis, and translates all feature points so that this feature point with No. 89 comes to a location of coordinate (0, 0) in the invariant feature space, the invariant feature group is arranged as shown in the invariant feature space of the right of the same figure.

Figure 37:
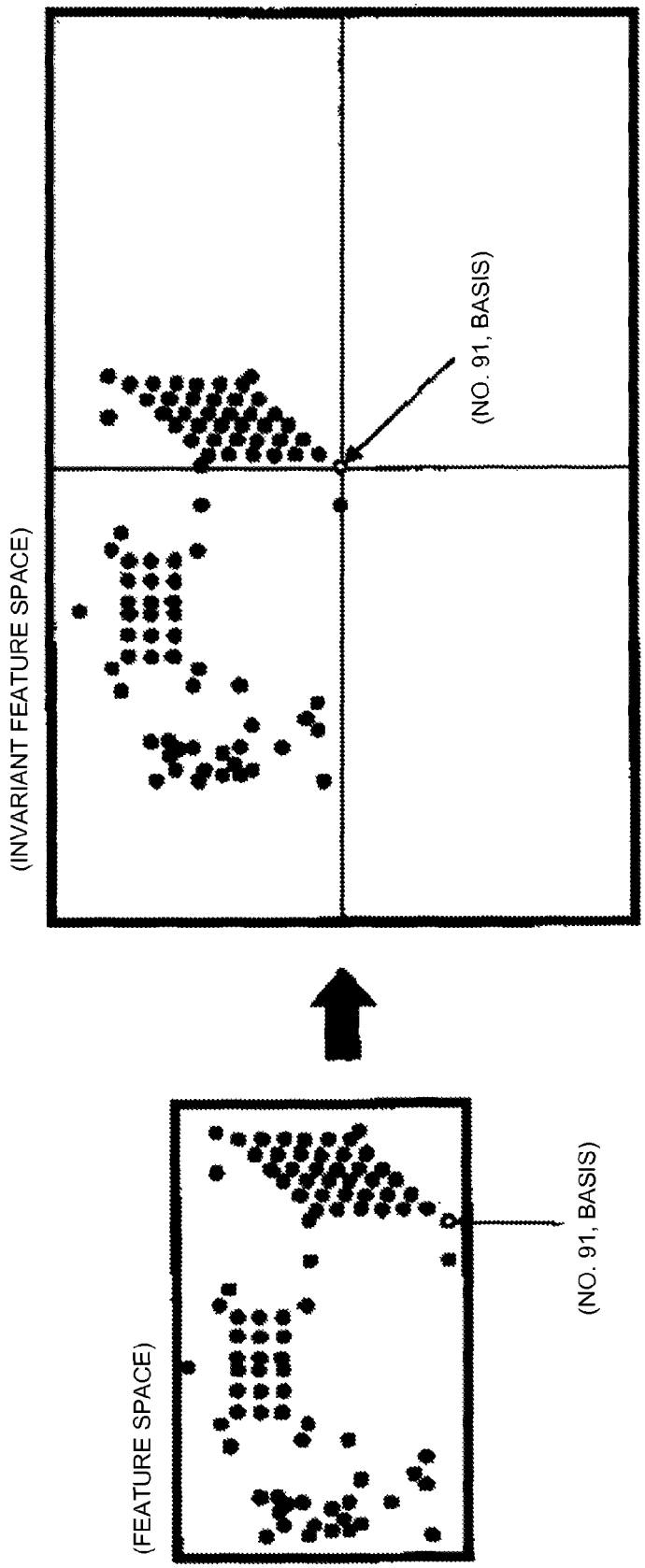
FIG. 37 is a view illustrating a situation in which respective feature points are mapped onto the invariant feature space with a feature point No. 91 defined as a basis.

And, as shown in FIG. 37, when the invariant feature converting unit 51 defines the feature point with serial No. 91 as the basis, and translates all feature points so that this feature point with No. 91 comes to a location of coordinate (0, 0) in the invariant feature space, the invariant feature group is arranged as shown in the invariant feature space of the right of the same figure.

In such a manner, the invariant feature converting unit 51 maps the feature points onto the invariant feature space by performing a process of deciding one feature point as the basis, moving this basis to an origin of the invariant feature space, and moving all feature points by a movement amount identical to the above amount, accompanied with this, whenever sequentially deciding each feature point as the basis, and superposing these moved feature points.

Figure 38:
FIG. 38 is a view illustrating a situation in which all feature points shown in FIG. 22 are mapped onto the invariant feature space.

A result of having mapped the feature points shown in FIG. 22 onto the invariant feature space is one shown in FIG. 38. This is a situation in which the invariant features have been arranged in the invariant feature space.

Additionally, while as a method of mapping the feature points onto the invariant feature space, the method shown in FIG. 34 to FIG. 38 are employed in this exemplary embodiment, the mapping method is not limited to these methods, and various methods may be employed.

For example, one feature point of a plurality of the feature points and another feature point are defined as a first basis and a second basis, respectively, the first basis and the second basis are moved to coordinate (0, 0) and coordinate (0, 1) of the invariant feature space, respectively, all other feature points are moved according to a conversion rule identical to this movement rule, accompanied with this, and the coordinate of each feature point (invariant feature) subjected to the movement in the invariant feature space is stored. Continuously, the other two feature points are defined as a first basis and a second basis, respectively, the first basis and the second basis are moved, all feature points are moved according to the identical conversion rule, accompanied with this, and the coordinates of the invariant features in the invariant feature space are stored. And, when all feature points are decided to be either the first basis or the second basis, and accumulation of the coordinates of the invariant features in the invariant feature space is completed, the mapping onto the invariant feature space is finished.

Further, while the above explanation of the operation was made on the geographical invariant, several kinds of invariants other than the geographical invariant may be used.

For example, an object color may be employed as the invariant.

The color of an object may vary in imaging even the object is same, dependent upon the color of the light source present on the imaging environment. When an influence of a fluctuation in the light source color can be separated and removed from the image, the actual object color can be obtained. The actual object color to be obtained may be used as the object-color invariant. A portion exhibiting specular reflection is principally affected by the light source color, and the luminance value tends to saturation for the light source color component so that the component may be regarded as the light source color to prevent the color component corresponding to the saturated portion from being selected as the invariant feature.

Besides, the methods of estimating the object color from the image that may be employed include a method by Robby T. Tan and Katsushi Ikeuchi, disclosed in "Separating Reflection Components of Textured Surfaces Using a Single Image" IEEE TRANSACTIONS ON PATTERN ANALYSIS AND MACHINE INTELLIGENCE, VOL. 27, NO. 2, FEBRUARY 2005, PP. 178-193, a method by Graham D. Finlayson, Steven D. Hordley, Cheng Lu, and Mark S. Drew disclosed in "On the Removal of Shadows from Images", IEEE TRANSACTIONS ON PATTERN ANALYSIS AND MACHINE INTELLIGENCE, VOL. 28, NO. 1, JANUARY 2006, PP. 59-68, and the like.

In addition, a texture may be employed as the invariant.

A luminance distribution for a partial region in the image is subjected to numerical computation, and the resulting numerical value or vector is defined as a feature quantity. Similarly to the graphical invariant, the texture invariant is susceptible to an influence of the relative positional relationship between the camera and the to-be-imaged target, and thus, the feature quantity insusceptible to this influence is calculated and defined as a texture invariant. For example, the feature quantity invariable against a distance between the camera and the target or a zoom may be implemented by converting a partial image of interest into polar coordinates and taking a power spectrum in the radius direction. In addition, the power spectrum may be taken again with respect to the above-power spectrum in the azimuthal direction to obtain the feature quantity that is invariable against the rotation around an optical axis of the camera. Besides, the method by Chi-Man Pun and Moon-Chuen Lee disclosed in "Log-Polar Wavelet Energy Signatures for Rotation and Scale Invariant Texture Classification" IEEE TRANSACTIONS ON PATTERN ANALYSIS AND MACHINE INTELLIGENCE, VOL. 25, NO. 5, May 2003, or the like may be employed.

Further, with regard to the geometrical invariant, another kind of the geometrical invariant such as that by Richard Hartley and Andrew Zisserman disclosed in "Multiple View Geometry in Computer Vision" may be also employed. When the same scene is observed by a plurality of cameras, the method disclosed in this literature enables information on a distance or a relative positional relationship in the depth direction to be acquired, and in this case, when four points lying in non-identical planes are selected as the bases and the invariant feature space is assumed to be three-dimensional, a three-dimensional geometric invariant may be created. At this moment, a conversion map is obtained in which one of four bases selected from the feature point groups is caused to correspond to an origin of the invariant space, and the feature points of the other bases are caused to correspond to position coordinates (1,0,0), (0,1,0) and (0,0,1) in the invariant space, and this conversion map is used to map the other features onto the invariant space.

Figure 39:
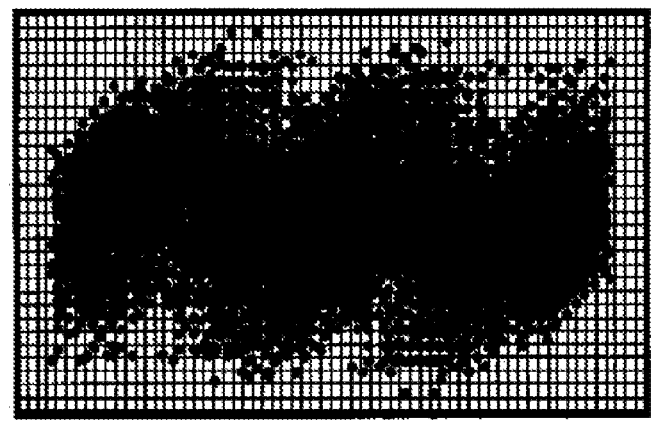
FIG. 39 is a view illustrating a situation in which segment lines are added to the invariant feature space.

The first invariant feature converting unit 51 having mapped the feature points onto the invariant feature space divides the invariant feature space into a plurality of the segments by using grid-shape mesh cells as shown in FIG. 39.

Figure 40:
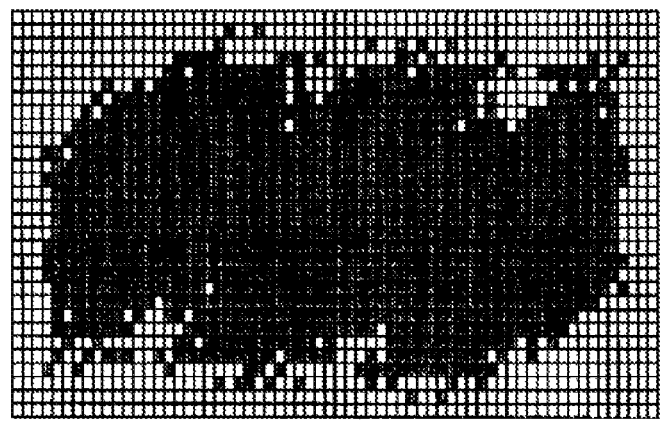
FIG. 40 is a view illustrating the invariant feature space in which the segments having one feature point or more arranged therein are hatched in a gray color.

Continuously, the first invariant feature converting unit 51 obtains the number of the invariant features for each segment. A result of this calculation is shown in FIG. 40. FIG. 40 is a view in which the segments of the invariant feature space in which the number of the invariant features is one or more have been colorized in gray color.

The second invariant feature converting unit 52 maps the feature points of the identifier onto the invariant feature space.

This method of the map is identical to the method of mapping the feature points of the background video image onto the invariant feature space that is performed by the first invariant feature converting unit 51.

Figure 41:
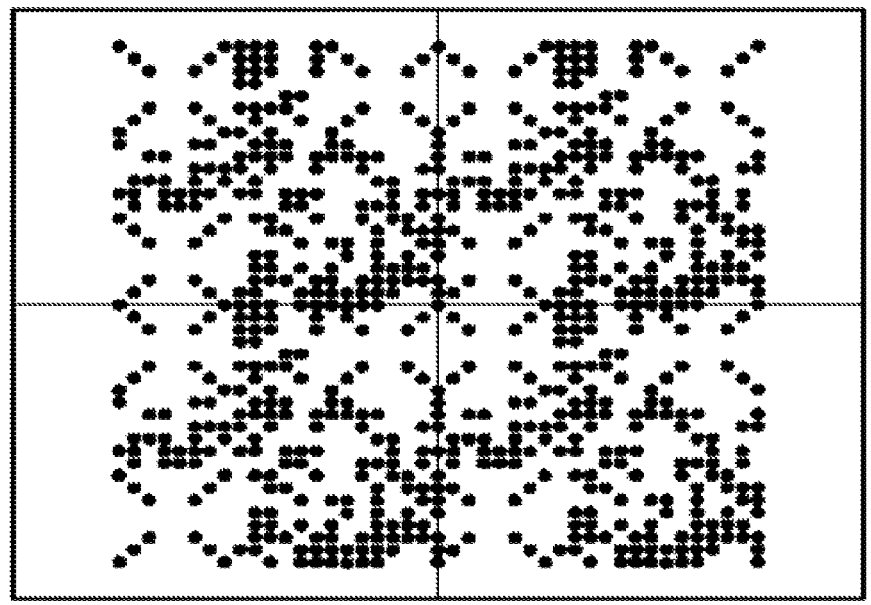
FIG. 41 is a view illustrating a situation in which the feature points of the identifier are mapped onto the invariant feature space.

For example, when the feature points shown in FIG. 10 are mapped onto the invariant feature space, the invariant features are arranged as shown in FIG. 41.

Further, for the invariant features in the invariant feature space, the second invariant feature converting unit 52 prepares "the identifier feature information table" (see FIG. 4). This prepared "identifier feature information table" is stored in the comparison information storing unit 12 of the feature comparing means 10.

The invariant feature storing unit 53 holds a predetermined memory region. This invariant feature storing unit 53 stores various kinds of data obtained by the first invariant feature converting unit 51. The various kinds of data contains, for example, the coordinates of respective invariant features arranged in the invariant feature space, the coordinates (scopes) of respective segments, respective by-segment invariant feature numbers, and the like.

Figure 42:
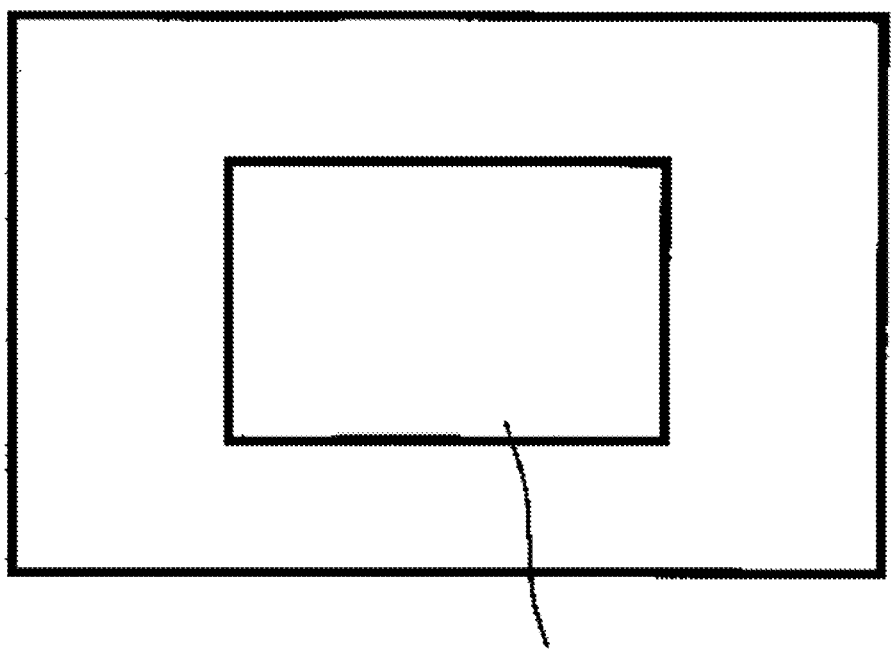
FIG. 42 is a view illustrating a marker pattern generation scope in the invariant feature space.

The unique feature selecting unit 54, as show in FIG. 42, decides a scope (scope in which a determination as to whether or not the identifier, being a determination target, can be used as the detection marker is made) of the invariant feature space in which the marker pattern is generated to be a marker pattern generation scope. Size of this marker pattern generation scope could be identical to that of the still image frame.

Next, the unique feature selecting unit 54 takes out the by-segment invariant feature numbers in the above marker pattern generation scope from the invariant feature storing unit 53. These taken-out by-segment invariant feature numbers are shown in FIG. 43.

Figure 43:
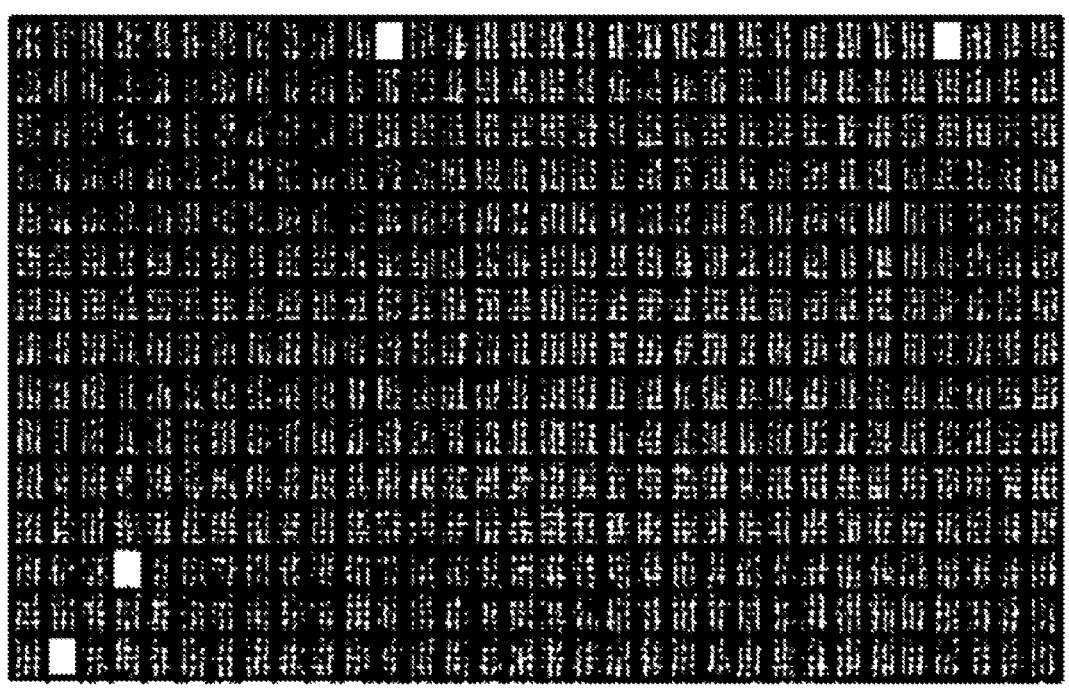
FIG. 43 is a view illustrating the marker pattern generation scope in which the segments having one feature point or more arranged therein are hatched in a gray color.

Additionally, FIG. 43 is a view in which the segments of the marker pattern generation scope in which the number of the invariant features is one or more have been colorized in a gray color.

Continuously, the unique feature selecting unit 54 selects the segments of the marker pattern generation scope of which the invariant feature number is zero, or equal to or less than a predetermined value, out of the by-segment invariant feature numbers, as the unique features.

And, the unique feature selecting unit 54 prepares "the unique feature information table" about the selected unique features (see FIG. 3), and causes the comparison information storing unit 12 to store it.

(II) Marker Generation Method

Figure 44:
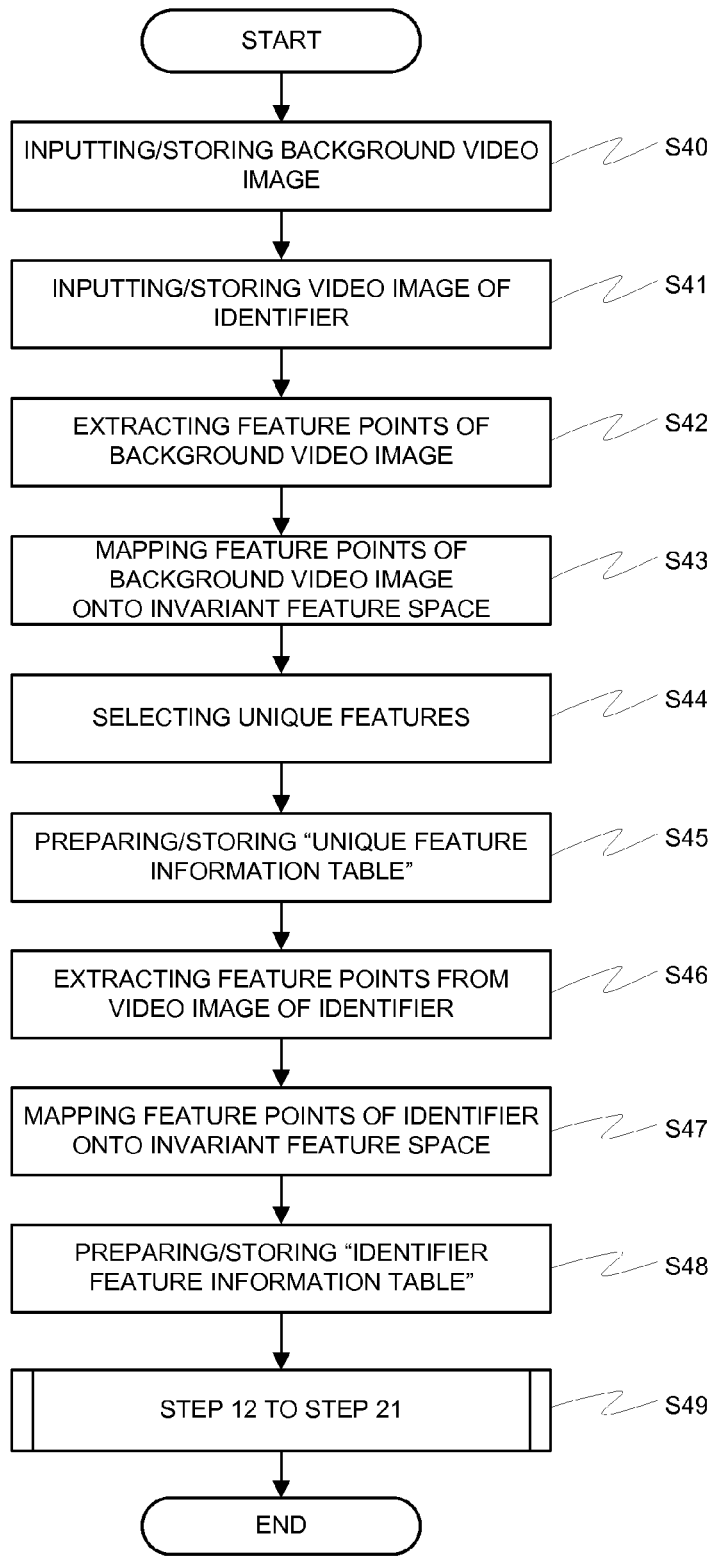
FIG. 44 is a flowchart illustrating an operation of the marker generation device in the third exemplary embodiment of the present invention.

Next, an operation of the marker generation device (a method of generating the marker) will be explained by making a reference to FIG. 44.

The same figure is a flowchart illustrating a processing procedure of the marker generation method of this exemplary embodiment.

In the marker generation device 1c, the video image inputting unit 31 of the video image inputting means 30 images (or inputs) the background video image (Step 40). This background video image may be configured of plural pieces of the frame images. The video image storing unit 32 of the video image inputting means 30 stores as the frame image the background video image inputted by the video image inputting unit 31.

Further, the video image inputting unit 31 images (or inputs) the video image of the identifier, being a determination target (Step 41). The video image storing unit 32 stores the video image of the identifier inputted by the video image inputting unit 31.

The background feature extracting unit 41 of the feature extracting means 40 takes out the frame image from the video image storing unit 32, and extracts the feature points from this frame image (Step 42).

Further, the background feature extracting unit 41 arranges these feature points in the feature space. And, the background feature extracting unit 41 calculates the coordinates of the feature points in the feature space. These calculated coordinates are put together as "the feature point information table", and are stored in the feature storing unit 43.

Next, the first invariant feature converting unit 51 of the invariant feature converting means 50 maps the feature points of the background video image onto the invariant feature space (Step 43).

Continuously, the first invariant feature converting unit 51 divides the invariant feature space into a plurality of segments by using grid-shape mesh cells. In addition, the first invariant feature converting unit 51 obtains the number of the invariant features for each segment, and selects the segments in which the invariant feature number is zero, or equal to or less than a predetermined number as the unique features (Step S44).

And, the first invariant feature converting unit 51 prepares "the unique feature information table" indicative of the coordinates of the selected unique features. The comparison information storing unit 12 of the feature comparing means 10 stores "the unique feature information table" (Step 45).

The identifier feature extracting unit 42 of the feature extracting means 40 takes out the image of the identifier from the video image storing unit 32, and extracts the feature points from the image of this identifier (Step 46).

Further, the identifier feature extracting unit 42 arranges these feature points in the feature space.

Next, the second invariant feature converting unit 52 maps the feature points of the identifier onto the invariant feature space (Step 47).

And, the second invariant feature converting unit 52 calculates the coordinates of the invariant features of the identifier in the invariant feature space. These calculated coordinates are put together as "the identifier feature information table", and stored in the comparison information storing unit 12 of the feature comparing means 10 (Step 48).

Hereinafter, a process similar to the process of the Step 12 to the Step 21 is performed.

As explained above, the marker generation device and the marker generation method of the present invention were configured to extract the feature points from the identifier, being a determination target, to map these feature points onto the invariant feature space, to count the number of the segments containing the feature points (invariant features) matching with the unique features in this invariant feature space, to convert the data arrangement pattern of the identifier, to count the number of the segments containing the invariant features matching with the unique features whenever performing this conversion, and to select the identifier with data arrangement pattern having a largest count value as the detection marker. This makes it possible to select the optimum identifier as the detection marker.

Additionally, while FIG. 41 illustrates the invariant feature space onto which the feature points of the identifier have been mapped, the feature points to be mapped onto this invariant feature space are not limited to the feature points extracted from the identifier alone, and for example, it is also possible to map the feature points extracted from the background containing the identifier. In this case, the feature points are extracted from the identifier and the background, these feature points are mapped onto the invariant feature space, and a determination is made as to whether or not the feature points match with the unique features. When the number of the feature points matching with the unique features is equal to more than a predetermined number as a result of the determination, it may be determined that the above identifier can be used as the detection marker.

Further, while the QR code was listed as an example of the identifier in the exemplary embodiment, the identifier is not limited to the QR code, and could be identifier obtained by encoding the data according to a predetermined rule (program).

[The Marker Detection Device and the Marker Detection Method]

(The Marker Detection Device)

Next, the marker detection device will be explained by making a reference to FIG. 45 and FIG. 46.

Figure 45:
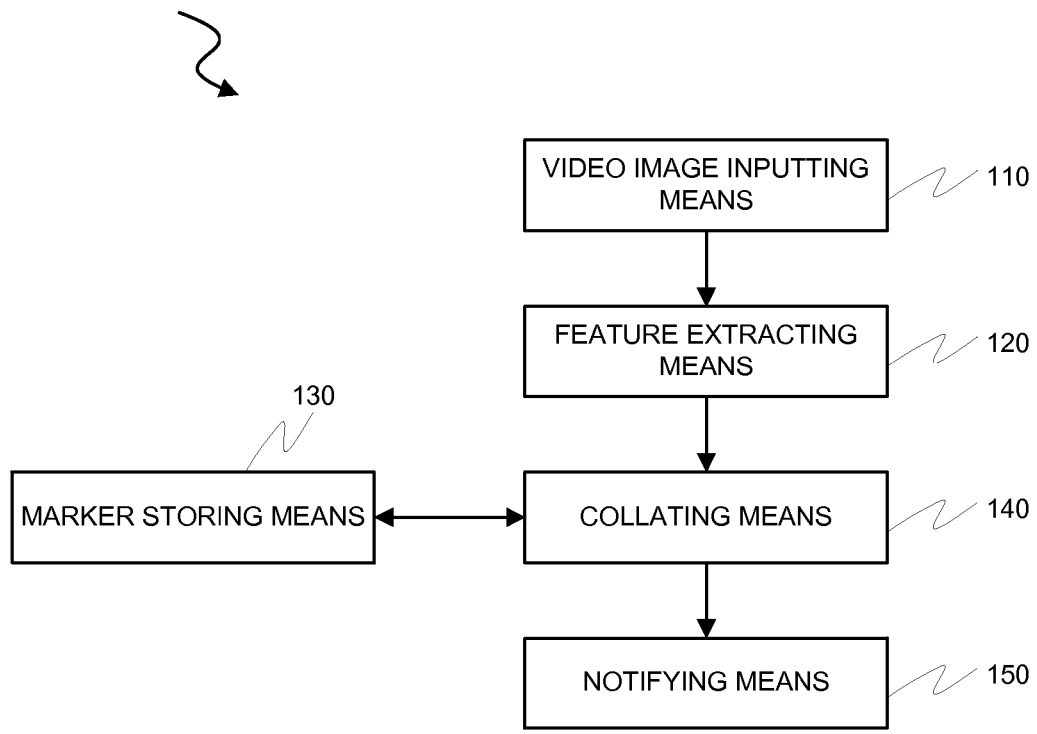
FIG. 45 is a block diagram illustrating a configuration of the marker detection device.

FIG. 45 is a block diagram illustrating a configuration of the marker detection device. FIG. 46 is a block diagram illustrating a detailed configuration of the marker detection device.

As shown in FIG. 45, a marker detection device 100 is provided with a video image inputting means 110, a feature extracting means 120, a marker storing means 130, a collating means 140, and a notifying means 150.

Figure 46:
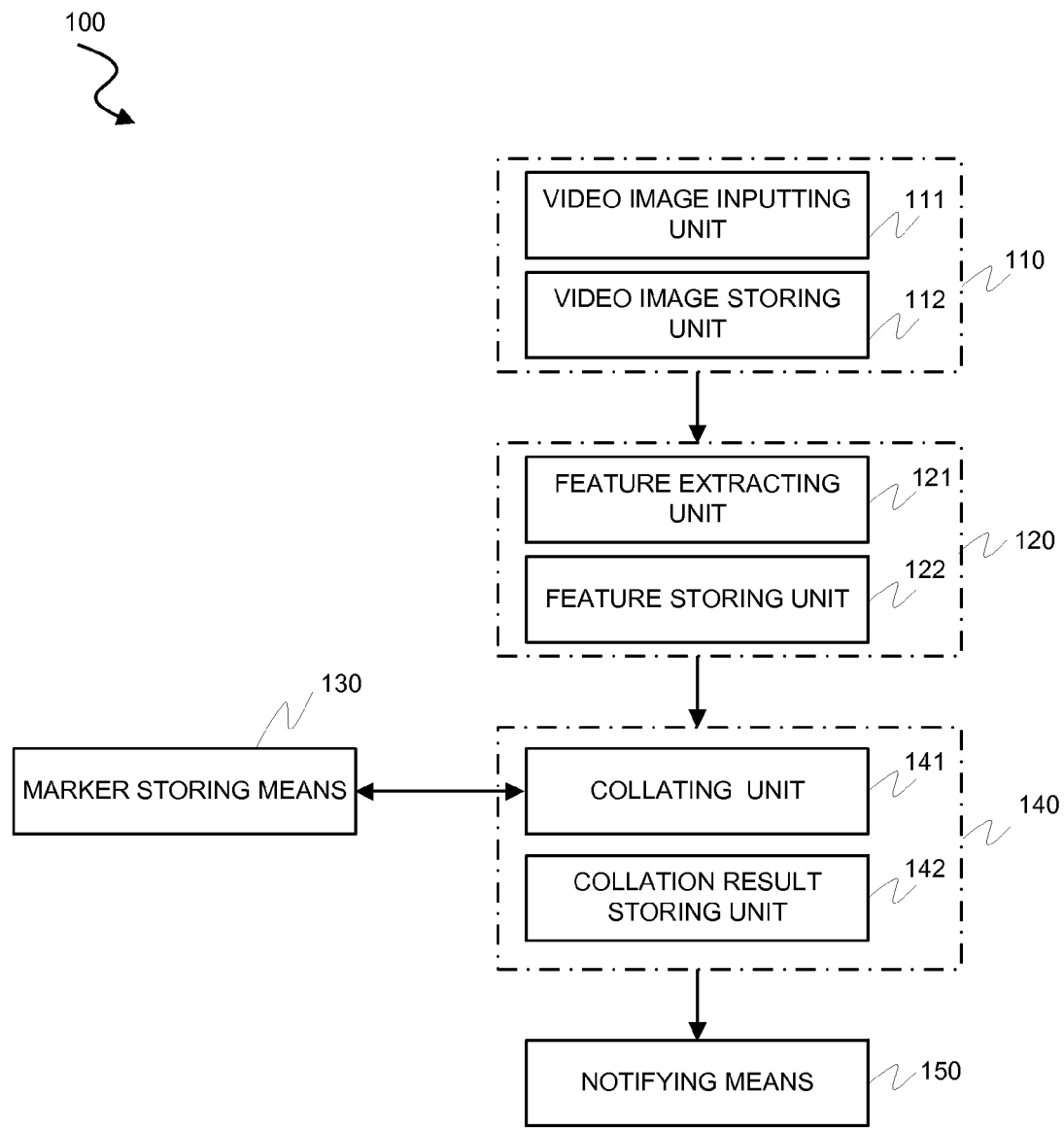
FIG. 46 is a block diagram illustrating a detailed configuration of the marker detection device.

Herein, the video image inputting means 110 includes a video image inputting unit 111 and a video image storing unit 112 as shown in FIG. 46.

Figure 47:
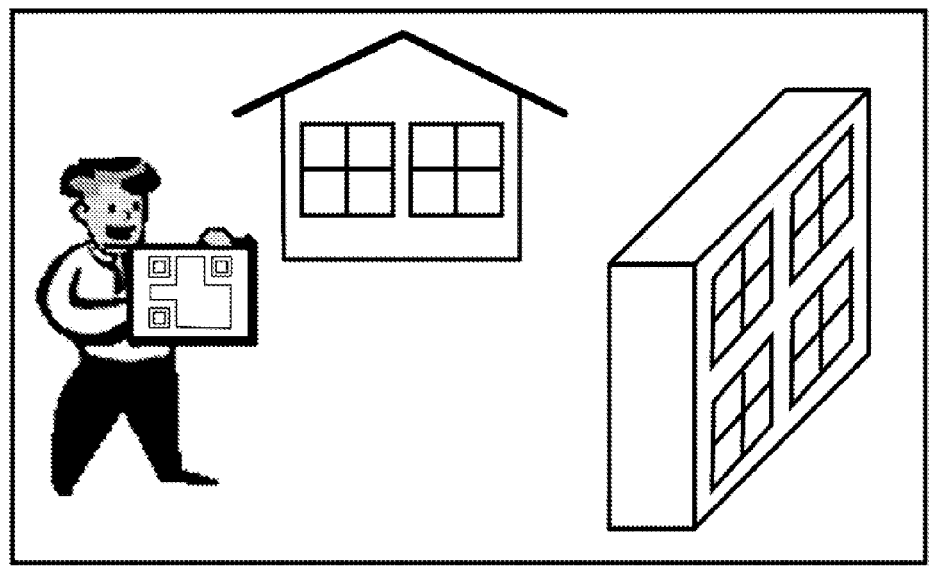
FIG. 47 is a view illustrating an example of the detection-targeted video image.

The video image inputting unit 111 images (inputs) the environment in which the marker might exist as the detection-targeted video image. For example, the video image inputting unit 111 may input the detection-targeted video image containing the marker as shown in FIG. 47.

The video image storing unit 112 stores the still image frames constituting the detection-targeted video image as digitalized frame images.

The feature extracting means 120 includes a feature extracting unit 121 and a feature storing unit 122 as shown in FIG. 46.

The feature extracting unit 121 takes out the frame images from the video image storing unit 112. And, the feature extracting unit 121 extracts the image features containing characteristic patterns in the taken-out frame images.

Figure 48:
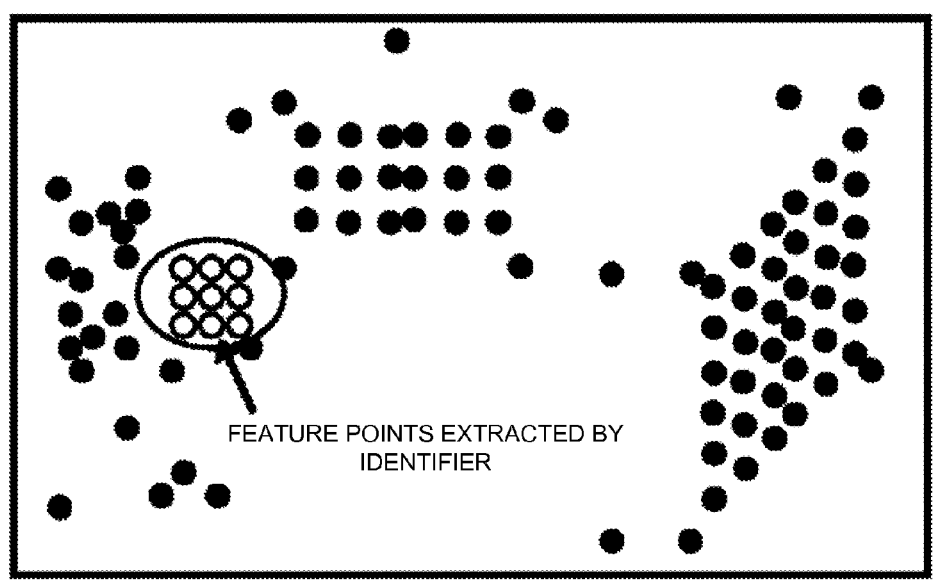
FIG. 48 is a view illustrating an example of the feature points extracted from the detection-targeted video image.

For example, when the detection-targeted video image is an image shown in FIG. 47, the feature extracting unit 121 extracts the feature points shown in FIG. 48 from the above detection-targeted video image.

The feature storing unit 122 stores each of the coordinates of the feature points extracted by the feature extracting unit 121.

The marker storing means 130 stores data related to the marker patterns determined by the marker generation device 1. This marker storing means 130 may store, for example, the feature points based upon the marker patterns.

The collating means 140, as shown in FIG. 46, includes a collating unit 141 and a collation result storing unit 142.

The collating unit 141 takes outs each of the coordinates of the feature points based upon the detection-targeted video images from the feature storing unit 122, takes out each of the coordinates of the feature points based upon the marker pattern from the marker storing means 130, and collates them. And, the collating unit 141 determines whether or not a feature point matching with the feature point based upon the marker pattern exists within the feature points based upon the detection-targeted video image.

For example, a configuration may be made so that when one feature of the marker pattern and one feature generated from the detection-targeted video image have an Euclidean distance equal to or less than a predetermined value in the feature space, these features may be regarded as a match, and the number of the features regarded as a match is accumulated as a score, and when the score reaches a threshold, the detection of the markers is acknowledged. Further, a condition that the accumulated value of the aforementioned Euclidean distances is equal to or less than a predetermined value may be added hereto.

Further, for example, when the feature extracting unit 21 of the marker generation device 1a performs the determination of the unique features in a quantized feature space, the marker storing means 130 stores the coordinates of the above unique features beforehand. And, when the feature coming from the detection-targeted video image has been projected even once onto the mesh cell having a frequency of zero at the time of designing the marker, the collating unit 141 may regard it as contribution from the marker pattern to confirm the detection. With this, the marker detection can be quickly performed.

So as to avoid the erroneous detection of the marker due to noise or an error in the feature extraction calculation, the frequency of the projection to be acknowledged may be defined as a predetermined value of one or more. Alternatively, when the quantized feature space can be generated from the marker pattern, it may be utilized. In this case, the marker pattern detection may be acknowledged when the unique feature obtained from the detection-targeted video image matches with a feature space mesh onto which the marker pattern is projected once or a predetermined number of times.

When, as a result of this collation, a feature point matching with the feature point based upon the marker pattern exists within the feature points based upon the detection-targeted video image, the collating unit 141 detects the coordinate of the above feature point in the detection-targeted video image, and causes the collation result storing unit 142 to store it. Further, the collating unit 141 sends out a notification signal to the notifying means 150.

On the other hand, when no feature point matching with the feature point based upon the marker pattern exists within the feature points based upon the detection-targeted video image, the collating unit 141 does not detect the coordinates of the feature points, nor sends out the notification signal.

Specifically, the collating unit 141 searches the feature point group shown in FIG. 48 for feature points matching with the feature points based upon the marker pattern taken out from the marker storing means 130. At this time, the collating unit 141 expands or reduces the feature point group based upon the marker pattern, and collates it with the feature point group in the feature space.

As a result, when the collating unit 141 finds the feature points matching with the feature points based upon the marker pattern extracted from the marker storing means 130, from among the feature point group shown in FIG. 48, it detects the coordinated of the above feature point in the feature space shown in FIG. 48, and causes the collation result storing unit 142 to store it.

The collation result storing unit 142 stores data related to the collation performed in the collating unit 141.

For example, the collation result storing unit 142 stores each of the coordinates of the feature points (in FIG. 48, feature points encircled by a left-side ellipse) matching with the feature points based upon the marker pattern, out of the feature points based upon the detection-targeted video image.

Upon receipt of the notification signal from the collating unit 141, the notifying means 150 notifies the outside that a feature point matching with the feature point based upon the marker pattern exists within the feature points based upon the detection-targeted video image. As a method of this notification, for example, there exists a voice output, a screen display, or the like.

(The Marker Detection Method)

Figure 49:
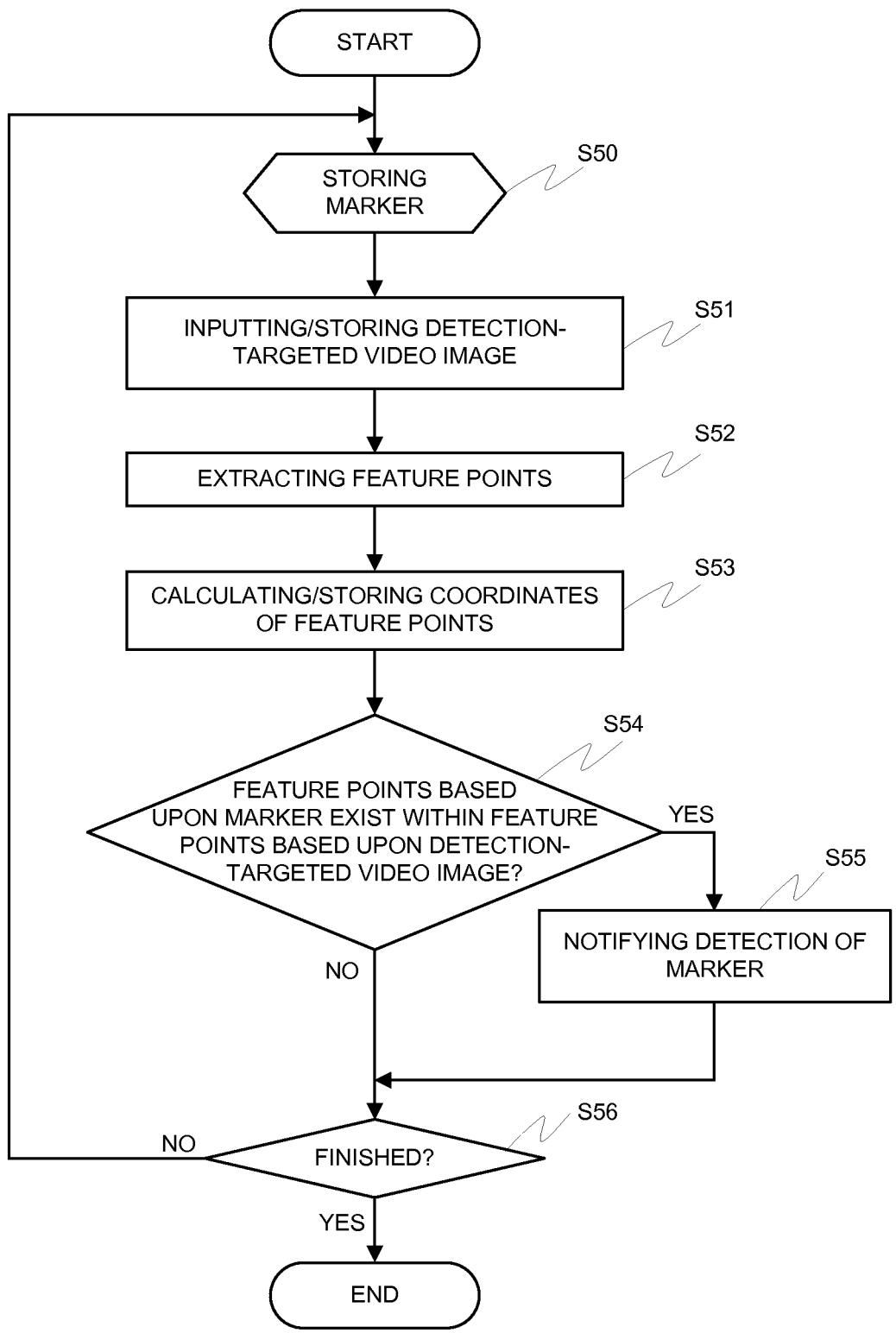
FIG. 49 is a flowchart illustrating a procedure of the marker detection method.

Next, the marker detection method of this exemplary embodiment will be explained by making a reference to FIG. 49.

The marker storing means 130 stores data related to the marker determined to be the determination target by the marker generation device 1 beforehand (Step 50). This marker storing means 130 may store, for example, the feature points based upon the marker pattern.

The video image inputting unit 111 of the video image inputting means 110 inputs the environment in which the marker might exist as the detection-targeted video image (Step 51).

The video image storing unit 112 stores the still image frames constituting the detection-targeted video image as digitalized frame images.

The feature extracting unit 121 of the feature extracting means 120 takes out the frame image from the video image storing unit 112. And, the feature extracting unit 121 extracts the image features containing characteristic patterns in the taken-out frame image (Step 52).

Further, the feature extracting unit 121 calculates the coordinates of the extracted feature points (Step 53).

The feature storing unit 122 stores each of the coordinates of the feature points calculated by the feature extracting unit 121.

The collating unit 141 of the collating means 140 takes outs each of the coordinates of the feature points based upon the detection-targeted video images from the feature storing unit 122, takes out each of the coordinates of the feature points based upon the marker pattern from marker storing means 130, and collates them (Step 54). And, the collating unit 141 determines whether or not a feature point matching with the feature point based upon the marker pattern exists within the feature points based upon the detection-targeted video image.

When, as a result of the determination, a feature point matching with the feature point based upon the marker pattern exists within the feature points based upon the detection-targeted video image, the collating unit 141 detects the coordinate of the above feature point in the detection-targeted video image, and causes the collation result storing unit 142 to store it. Further, the collating unit 141 sends out the notification signal to the notifying means 150.

On the other hand, when no feature point matching with the feature point based upon the marker pattern exists within the feature points based upon the detection-targeted video image, the collating unit 141 does not detect the coordinates of the feature points, nor sends outs the notification signal.

Upon receipt of the notification signal from the collating unit 141, the notifying means 150 notifies the outside that a feature point matching with the feature point based upon the marker pattern exists within the feature points based upon the detection-targeted video image (Step 55).

Thereafter, a determination as to whether or not to finish the operation is made (Step 56), and processes of the Step 51 to the Step 56 are repeated when the operation is not finished.

As explained above, the marker detection device and the marker detection method of this exemplary embodiment enable the marker reflected onto the detection-targeted video image to be surely detected by employing the identifier determined to be usable as the detection marker by the marker generating device.

Further, while it was assumed that the detection of the marker was implemented in the feature space in this exemplary embodiment, the detection of the marker is not limited to the implementation in the feature space, and for example, the detection of the marker may be implemented in the invariant feature space. In this case, in the marker determination stage, the unique feature arrangement diagram from which the unique features have been selected is stored beforehand, and in the marker detection stage, the feature points are extracted from the detection-targeted video image, these feature points are mapped onto the invariant feature space and are defined as the invariant features, this invariant feature space and the aforementioned unique feature arrangement diagram are superposed, and when the invariant feature indicated in the invariant feature space appears in the unique features indicated in the unique feature arrangement diagram, this invariant feature may be detected as the invariant feature based upon the marker.

In addition, when the object-color invariant and the texture invariant are employed at the time of determining the detection marker, the marker is detected by employing these object-color invariant and texture invariant at the time of detecting the marker. In this case, in the marker determination stage, the object-color invariant and the texture invariant are extracted from the background video image, and the unique features based upon these are selected and stored beforehand, and in the marker detection stage, when the object-color invariant and the texture invariant are extracted from the detection-targeted video image, and these object-color invariant and texture invariant match with the unique feature, these object-color invariant and texture invariant may be detected as the marker.

[The Marker Generation Detection Device and the Marker Generation Detection System]

(The Marker Generation Detection Device)

Next, the marker generation detection device will be explained by making a reference to FIG. 50.

Figure 50:
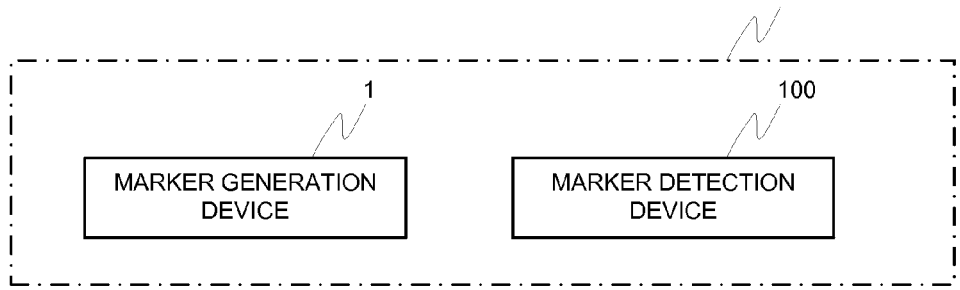
FIG. 50 is a block diagram illustrating a configuration of the marker generation detection device.

FIG. 50 is a block diagram illustrating a configuration of the marker generation detection device.

As shown in FIG. 50, a marker generation detection device 1000 is provided with a marker generation device 1 and a marker detection device 100.

Herein, as the marker generation device 1, any of the marker generation devices 1 of the first exemplary embodiment to the third exemplary embodiment described before may be employed.

As the marker detection device 100, the marker detection device 100 shown in FIG. 45 described before may be employed.

In such a manner, the marker generation detection device 1000 may assume a configuration in which the marker generation device 1 and the marker detection device 100 are unified.

Figure 51:
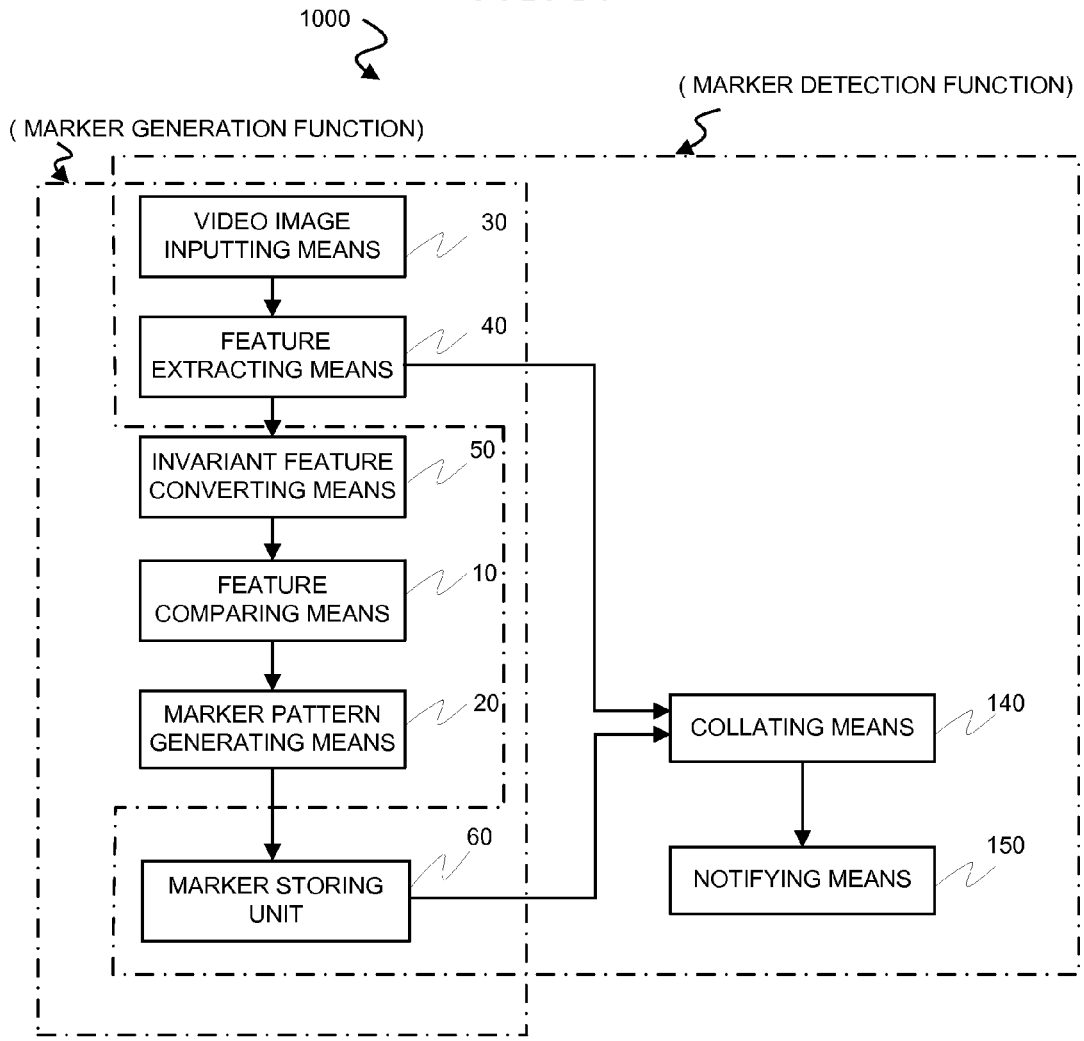
FIG. 51 is a block diagram illustrating a detailed configuration of the marker generation detection device.

Further, the marker generation detection device 1000 may assume a configuration as shown in FIG. 51 because the marker generation device 1 and the marker detection device 100 include a function that can be shared.

For example, the marker generation detection device 1000 includes a video image inputting means 30, a feature extracting means 40, an invariant feature converting means 50, a feature comparing means 10, a marker pattern generating means 20, a marker storing unit 60, a collating means 140, and a notifying means 150.

The video image inputting means 30, the feature extracting means 40, the invariant feature converting means 50, the feature comparing means 10, the marker pattern generating means 20, and the marker storing unit 60, out of them, include a function as the marker generation device, respectively.

On the other hand, the video image inputting means 30, the feature extracting means 40, the marker storing unit 60, the collating means 140, and the notifying means 150 include a function as the marker detection device, respectively.

And, the video image inputting means 30, the feature extracting means 40, and the marker storing unit 60 are portions that are common in the marker generation device and the marker detection device.

The marker generation method in the marker generation device is similar to the marker generation method in the first exemplary embodiment to the third exemplary embodiment described before.

Further, the marker detection method in the marker detection device is similar to the marker detection method in the exemplary embodiments described before.

(The Marker Generation Detection System)

Next, the marker generation detection system of this exemplary embodiment will be explained by making a reference to FIG. 52.

As shown in the same figure, a marker generation detection system 2000 is provided with a marker generation device 1 and a marker detection device 100. These marker generation device 1 and marker detection device 100 may be connected to each other via a communication network, a communication cable 300, or the like.

The marker generation device 1 includes a video image inputting means 30, a feature extracting means 40, an invariant feature conversion means 50, a feature comparing means 10, a marker pattern generating means 20, a marker storing unit 60, and a communicating means 70.

The communicating means 70 takes out data related to the markers stored in the marker storing unit 60, and transmit it to the marker detection device 100.

The marker detection device 100 includes a video image inputting means 110, a feature extracting means 120, a marker storing means 130, a collating means 140, a notifying means 150, and a communicating means 160.

The communicating means 160 receives the data related to the markers transmitted from the marker generation device 1. Further, the communicating means 160 causes the marker storing means 130 to store the above received data related to the markers.

As explained above, the marker generation detection device and the marker generation detection system make it possible to determine whether or not the existing identifier or the identifiers of which the design has been already decided could be fit as the detection target of the marker detection device.

[The Marker Generation Program and the Marker Detection Program]

Next, the marker generation program and the marker detection program will be explained.

The marker determination function (function of executing the marker generation method) and the marker detection function (function of executing the marker detection method) of a computer (the marker generation device, the marker detection device, the marker generation detection device, and the marker generation detection system) in the above-mentioned each exemplary embodiment are realized with the marker generation program or the marker detection program stored in the storing means (for example, ROM (Read Only Memory), a hard disk, or the like).

The marker generation program and the marker detection program, which are loaded into a controlling means (CPU (Central Processing Unit) etc.) of the computer, send a command to each of the components of the computer, and cause the components of the computer to execute predetermined processes, for example, the video image input process, the feature extraction process, the unique feature selection process, the match determination process, the marker determination process, the invariant feature conversion process of the marker generation device as well as the video image input process, the feature extraction process, the collation process, and the notification process of the marker detection device, and the like.

With this, the configuring means of the marker generation program, being software, and the computer (the marker generation device, the marker detection device, the marker generation detection device, and the marker generation detection system), being the hardware resource, cooperate with each other, thereby allowing the marker determination function and the marker detection function to be realized.

Additionally, the marker generation program for realizing the marker determination function and the marker detection function is stored in ROM and a hard disk of the computer, and the like, and besides, it may be filed in computer-readable recording mediums, for example, an external storage device and a portable recording medium.

The so-called external storage device could be a memory expansion device that has the recording medium such as CD-ROM (Compact Disc-Read Only Memory) built-in therein and is externally connected to the marker generation device. On the other hand, the so-called portable recording medium is a recording medium that is installable into a recording medium driving device (driving device) and yet is portable, and for example, could be a flexible disc, a memory card, an optical magnetic disc, and the like.

And, the program recorded in the recording medium is loaded into RAM (Random Access Memory) of the computer or the like, and is executed by CPU (controlling means). This execution allows the function of the marker generation device of each exemplary embodiment described above to be realized.

In addition, when the marker generation program is loaded by the computer, the marker generation program kept by other computers may be downloaded into RAM or an external storage device, which the above computer includes, by utilizing a communication line. This downloaded marker generation program is also executed by CPU, and the marker determination function of the marker generation device of each of the above-mentioned exemplary embodiments is realized.

As explained above, the marker generation device, the marker generation detection system, the marker generation detection device, the marker, the marker generation method, and the marker generation program makes it possible to select the identifier with the data arrangement pattern that is optimum as the detection marker.

While the preferred exemplary embodiments of the marker generation device, the marker generation detection system, the marker generation detection device, the marker, the marker generation method, and the marker generation program of the present invention were explained above, the marker generation device, the marker generation detection system, the marker generation detection device, the marker, the marker generation method, and the marker generation program in accordance with the present invention are not limited only to the exemplary embodiments described above, and it will be understood that various changes in form and details may be made herein without departing from the spirit and scope of the present invention as defined by the claims.

For example, while in the exemplary embodiments described above, the method of making a determination with one identifier taken as a determination-target identifier was explained, the number of the determination-target identifiers is not limited to one (1), and a plurality of the identifiers may employed at a time to make a determination.

Further, the marker generation device may be provided with a notifying means. The notifying means, upon receipt of the notification signal from the feature comparing unit, notifies a result of a determination as to whether or not the determination-target identifier can be used as the detection marker to the outside. As a method of this notification, for example, there exists a voice output, a screen display, or the like.

Further, when, in a case in which the background video image is changed temporally, the feature point of the identifier and the unique feature are not superposed temporally in the feature space or the invariant feature space, the feature comparing unit may determine that the above identifier can be used as the detection marker.

Additionally, as the marker generation device, the marker generation detection system, the marker generation detection device, and the marker generation method of the present invention, the marker generation devices or the marker generation methods in the first exemplary embodiment, the second exemplary embodiment, and the third exemplary embodiment may be arbitrarily combined.

Further, the content of the above-mentioned exemplary embodiments can be expressed as follows.

(Supplementary note 1) A marker generation device in which feature points extracted from an image are arranged in a predetermined space, and portions of this predetermine space in which the number of said feature points is equal to or less than a predetermined number are defined as unique features, comprising:

a feature comparing means that arranges the feature points extracted from an identifier in the predetermined space, and counts the number of the feature points matching with said unique features; and a marker pattern generating means that converts a configuration of said identifier, and extracts said feature points from this identifier subjected to the conversion, wherein said feature comparing means arranges the feature points extracted from said identifier subjected to the conversion in said predetermined space, counts the number of the feature points matching with said unique features, and selects as a detection marker the identifier of which said count number is most numerous, out of the identifier not subjected to the conversion and one identifier subjected to the conversion, or two or more.

(Supplementary note 2) A marker generation device according to Supplementary note 1, comprising:

a video image inputting means that images said image;

a feature extracting means that extracts the feature points from said image; and a unique feature selecting means that arranges said feature points in a feature space, and selects as said unique features portions of this feature space in which the number of said feature points is equal to or less than a predetermined number:

wherein said feature comparing means arranges the feature points extracted from the identifier in the predetermined space, and counts the number of the feature points matching with said unique features;

wherein said marker pattern generating means converts a configuration of said identifier, and extracts said feature points from this identifier subjected to the conversion; and wherein said feature comparing means arranges the feature points extracted from said identifier subjected to the conversion in said predetermined space, counts the number of the feature points matching with said unique features, and selects as the detection marker the identifier of which said count number is most numerous, out of the identifier not subjected to the conversion and one identifier subjected to the conversion, or two or more.

(Supplementary note 3) A marker generation device according to Supplementary note 1, comprising:

a video image inputting means that images said image;

a feature extracting means that extracts the feature points from said image; and an invariant feature converting means that maps the feature points extracted from said image onto an invariant feature space, and selects as said unique features portions of this invariant feature space in which the number of said feature points is equal to or less than a predetermined number:

wherein said feature comparing means arranges the feature points extracted from the identifier in the predetermined space, and counts the number of the feature points matching with said unique features;

wherein said marker pattern generating means converts a configuration of said identifier, and extracts said feature points from this identifier subjected to the conversion; and wherein said feature comparing means arranges the feature points extracted from said identifier subjected to the conversion in said predetermined space, counts the number of the feature points matching with said unique features, and selects as the detection marker the identifier of which said count number is most numerous, out of the identifier not subjected to the conversion and one identifier subjected to the conversion, or two or more.

(Supplementary note 4) A marker generation device according to one of Supplementary note 1 to Supplementary note 3, comprising a notifying means that notifies a result of a determination by said feature comparing means to the outside.

(Supplementary note 5) A marker generation detection system comprising a marker generation device and a marker detection device:

wherein said marker generation device comprises:

a first video image inputting means that inputs an image;

a first arranging means that extracts feature points from said image inputted by this first video image inputting means, and displays these extracted feature points onto a predetermined space;

a unique feature selecting means that selects as unique features portions of said space in which the number of said feature points is equal to or less than a predetermined number;

a feature comparing means that arranges the feature points extracted from an identifier in the predetermined space, and counts the number of the feature points matching with said unique features; and a marker pattern generating means that converts a configuration of said identifier, and extracts said feature points from this identifier subjected to the conversion;

wherein said feature comparing means arranges the feature points extracted from said identifier subjected to the conversion in said predetermined space, counts the number of the feature points matching with said unique features, and selects as a detection marker the identifier of which said count number is most numerous, out of the identifier not subjected to the conversion and one identifier subjected to the conversion, or two or more; and wherein said marker detection device comprises:

a second video image inputting means that inputs the image;

a second arranging means that extracts the feature points based upon said image inputted by this second video image inputting means, and displays these extracted feature points onto the predetermined space; and a collating means that determines whether or not an arrangement of the feature point based upon said detection marker exists in an arrangement of a feature point group displayed onto said predetermined space.

(Supplementary note 6) A marker generation detection system according to Supplementary note 5:

wherein said first arranging means arranges said extracted feature points in a feature space; and wherein said unique feature selecting means selects as the unique features portions of said feature space in which the number of said feature points is equal to or less than a predetermined number.

(Supplementary note 7) A marker generation detection system according to Supplementary note 5:

wherein said first arranging means maps said extracted feature points onto an invariant feature space; and wherein said unique feature selecting means selects as the unique features portions of said invariant feature space in which the number of said feature points is equal to or less than a predetermined number.

(Supplementary note 8) A marker generation detection device, comprising:

a first video image inputting means that inputs an image;

a first arranging means that extracts feature points from said image inputted by this first video image inputting means, and displays these extracted feature points onto a predetermined space;

a unique feature selecting means that selects as unique features portions of said space in which the number of said feature points is equal to or less than a predetermined number;

a feature comparing means that arranges the feature points extracted from an identifier in the predetermined space, and counts the number of the feature points matching with said unique features;

a marker pattern generating means that converts a configuration of said identifier, and extracts said feature points from this identifier subjected to the conversion;

a marker storing means that stores a marker;

a second video image inputting means that inputs the image;

a second arranging means that extracts the feature points based upon said image inputted by this second video image inputting means, and displays these extracted feature points onto the predetermined space; and a collating means that determines whether or not an arrangement of the feature point corresponding to said marker exists in an arrangement of a feature point group displayed onto said predetermined space, wherein said feature comparing means arranges the feature points extracted from said identifier subjected to the conversion in the said predetermined space, counts the number of the feature points matching with said unique features, and selects as a detection marker the identifier of which said count number is most numerous, out of the identifier not subjected to the conversion and one identifier subjected to the conversion, or two or more.

(Supplementary note 9) A marker generation detection device according to Supplementary note 8, wherein said first arranging means arranges said extracted feature points in a feature space; and wherein said unique feature selecting means selects as the unique features portions of said feature space in which the number of said feature points is equal to or less than a predetermined number.

(Supplementary note 10) A marker generation detection device according to Supplementary note 8, wherein said first arranging means maps said extracted feature points onto an invariant feature space; and wherein said unique feature selecting means selects as the unique features portions of said invariant feature space in which the number of said feature points is equal to or less than a predetermined number.

(Supplementary note 11) A marker, wherein said marker is, when feature points are extracted from an image, these extracted feature points are displayed in a predetermined space, portions of said predetermine space in which the number of said feature points is equal to or less than a predetermined number are selected as unique features, the feature points are selected from an identifier, these feature points are arranged in said predetermined space, the number of the feature points matching with said unique features is counted, a configuration of said identifier is converted, the feature points are extracted from the identifier subjected to the conversion, these feature points are arranged in the predetermined space, the number of the feature points matching with said unique features is counted, and the identifier having a largest count number, out of respective numbers of the identifiers not subjected to the conversion and subjected to the conversion, is selected as a detection marker, the above selected identifier.

(Supplementary note 12) A marker according to Supplementary note 11, wherein said extracted feature points are arranged in a feature space, and portions of this feature space in which the number of said feature points is equal to or less than a predetermined number are selected as unique features.

(Supplementary note 13) A marker according to Supplementary note 11, wherein said extracted feature points are mapped onto in an invariant feature space, and portions of said invariant feature space in which the number of said feature points is equal to or less than a predetermined number are selected as unique features.

(Supplementary note 14) A marker generation method comprising the steps of:

inputting an image;

extracting feature points from said image, and displaying these extracted feature points onto a predetermined space;

selecting as unique features portions of said space in which the number of said feature points is equal to or less than a predetermined number;

arranging the feature points extracted from an identifier in the predetermined space, and counting the number of the feature points matching with said unique features;

converting a configuration of said identifier, and extracting said feature points from this identifier subjected to the conversion; and arranging the feature points extracted from said identifier subjected to the conversion in said predetermined space, counting the number of the feature points matching with said unique features, and selecting as a detection marker the identifier of which said count number is most numerous, out of the identifier not subjected to the conversion and one identifier subjected to the conversion, or two or more.

(Supplementary note 15) A marker generation method according to Supplementary note 14, comprising a step of arranging the feature points extracted from said identifier in a feature space, and determining that said existing identifier can be used as a marker that is detectable from said image when the number of the feature points matching with said unique features is equal to or more than a predetermined number.

(Supplementary note 16) A marker generation method according to Supplementary note 14, comprising a step of arranging the feature points extracted from said identifier in an invariant feature space, and determining that said existing identifier can be used as a marker that is detectable from said image when the number of the feature points matching with said unique features is equal to or more than a predetermined number.

(Supplementary note 17) A marker generation program for causing an information processing device to execute the processes of:
 inputting an image;
 extracting feature points from said image, and displaying these extracted feature points onto a predetermined space;
 selecting as unique features portions of said space in which the number of said feature points is equal to or less than a predetermined number;
 arranging the feature points extracted from an identifier in the predetermined space, and counting the number of the feature points matching with said unique features;
 converting a configuration of said identifier, and extracting said feature points from this identifier subjected to the conversion; and
 arranging the feature points extracted from said identifier subjected to the conversion in said predetermined space, counting the number of the feature points matching with said unique features, and selecting as a detection marker the identifier of which said count number is most numerous, out of the identifier not subjected to the conversion and one identifier subjected to the conversion, or two or more.

(Supplementary note 18) A marker generation program according to Supplementary note 17, causing the information processing device to execute a process of arranging the feature points extracted from said identifier in a feature space, and determining that said existing identifier can be used as a marker that is detectable from said image when the number of the feature points matching with said unique features is equal to or more than a predetermined number.

(Supplementary note 19) A marker generation program according to Supplementary note 17, causing the information processing device to execute a process of arranging the feature points extracted from said identifier in an invariant feature space, and determining that said existing identifier can be used as a marker that is detectable from said image when the number of the feature points matching with said unique features is equal to or more than a predetermined number.

This application is based upon and claims the benefit of priority from Japanese patent application No. 2009-171841, filed on Jul. 23, 2009, the disclosure of which is incorporated herein in its entirety by reference.

Industrial Applicability

The present invention is an invention relating to generation of a marker, and may be applied to fields for devices or appliances for generating a marker. Besides, the present invention may also be applied for fields of video image monitoring such as those represented by article management and physical security, robot vision, mixed reality UI, and content generation.

Reference Signs List
1 marker generation device
10 feature comparing means
20 marker pattern generating means
30 video image inputting means
40 feature extracting means
50 invariant feature converting means
60 marker storing unit
100 marker detection device
110 video image inputting means
120 feature extracting means
130 storing means
140 collating means
1000 marker generation detection device
2000 marker generation detection system

The invention claimed is:

1. A marker generation device in which feature points extracted from an image are arranged in a predetermined space, and portions of this predetermine space in which the number of said feature points is equal to or less than a predetermined number are defined as unique features, comprising:
 a feature comparator that arranges the feature points extracted from an identifier in the predetermined space, and counts the number of the feature points matching with said unique features; and
 a marker pattern generator that converts a configuration of said identifier, and extracts said feature points from this identifier subjected to the conversion, wherein said feature comparator arranges the feature points extracted from said identifier subjected to the conversion in said predetermined space, counts the number of the feature points matching with said unique features, and selects as a detection marker the identifier of which said count number is most numerous, out of the identifier not subjected to the conversion and one identifier subjected to the conversion, or two or more.

2. A marker generation device according to claim 1, comprising:
 a video image inputting unit configured to image said image;
 a feature extracting unit configured to extract the feature points from said image; and
 a unique feature selector configured to arrange said feature points in a feature space, and select as said unique features portions of this feature space in which the number of said feature points is equal to or less than a predetermined number:
 wherein said feature comparator is configured to arrange the feature points extracted from the identifier in the predetermined space, and count the number of the feature points matching with said unique features;
 wherein said marker pattern generator is configured to convert a configuration of said identifier, and extract said feature points from this identifier subjected to the conversion; and
 wherein said feature comparator is configured to arrange the feature points extracted from said identifier subjected to the conversion in said predetermined space, count the number of the feature points matching with said unique features, and select as the detection marker the identifier of which said count number is most numerous, out of the identifier not subjected to the conversion and one identifier subjected to the conversion, or two or more.

3. A marker generation device according to claim 1, comprising:
- a video image inputting unit configured to image said image;
- a feature extracting unit configured to extract the feature points from said image; and
- an invariant feature converter configured to map the feature points extracted from said image onto an invariant feature space, and select as said unique features portions of this invariant feature space in which the number of said feature points is equal to or less than a predetermined number:
- wherein said feature comparator is configured to arrange the feature points extracted from the identifier in the predetermined space, and count the number of the feature points matching with said unique features;
- wherein said marker pattern generator is configured to convert a configuration of said identifier, and extract said feature points from this identifier subjected to the conversion; and
- wherein said feature comparator is configured to arrange the feature points extracted from said identifier subjected to the conversion in said predetermined space, count the number of the feature points matching with said unique features, and select as the detection marker the identifier of which said count number is most numerous, out of the identifier not subjected to the conversion and one identifier subjected to the conversion, or two or more.

4. A marker generation device according to claim 1, comprising a notifying unit configured to notify a result of a determination by said feature comparator to the outside.

5. A marker generation detection system comprising a marker generation device and a marker detection device:
- wherein said marker generation device comprises:
  - a first video image inputting unit configured to input an image;
  - a first arranging unit configured to extract feature points from said image inputted by this first video image inputting unit, and display these extracted feature points onto a predetermined space;
  - a unique feature selector configured to select as unique features portions of said space in which the number of said feature points is equal to or less than a predetermined number;
  - a feature comparator configured to arrange the feature points extracted from an identifier in the predetermined space, and count the number of the feature points matching with said unique features; and
  - a marker pattern generator configured to convert a configuration of said identifier, and extract said feature points from this identifier subjected to the conversion;
  - wherein said feature comparator is configured to arrange the feature points extracted from said identifier subjected to the conversion in said predetermined space, count the number of the feature points matching with said unique features, and select as a detection marker the identifier of which said count number is most numerous, out of the identifier not subjected to the conversion and one identifier subjected to the conversion, or two or more; and
- wherein said marker detection device comprises:
  - a second video image inputting unit configured to input the image;
  - a second arranging unit configured to extract the feature points based upon said image inputted by this second video image inputting unit, and display these extracted feature points onto the predetermined space; and
  - a collating unit configured to determine whether or not an arrangement of the feature point based upon said detection marker exists in an arrangement of a feature point group displayed onto said predetermined space.

6. A marker generation detection system according to claim 5:
- wherein said first arranging unit is configured to arrange said extracted feature points in a feature space; and
- wherein said unique feature selector is configured to select as the unique features portions of said feature space in which the number of said feature points is equal to or less than a predetermined number.

7. A marker generation detection system according to claim 5:
- wherein said first arranging unit is configured to map said extracted feature points onto an invariant feature space; and
- wherein said unique feature selector is configured to select as the unique features portions of said invariant feature space in which the number of said feature points is equal to or less than a predetermined number.

8. A marker generation detection device, comprising:
- a first video image inputting unit configured to input an image;
- a first arranging unit configured to extract feature points from said image inputted by this first video image inputting unit, and display these extracted feature points onto a predetermined space;
- a unique feature selector configured to select as unique features portions of said space in which the number of said feature points is equal to or less than a predetermined number;
- a feature comparator configured to arrange the feature points extracted from an identifier in the predetermined space, and count the number of the feature points matching with said unique features;
- a marker pattern generator configured to convert a configuration of said identifier, and extract said feature points from this identifier subjected to the conversion;
- a marker storing unit configured to store a marker;
- a second video image inputting unit configured to input the image;
- a second arranging unit configured to extract the feature points based upon said image inputted by this second video image inputting unit, and display these extracted feature points onto the predetermined space; and
- a collating unit configured to determine whether or not an arrangement of the feature point corresponding to said marker exists in an arrangement of a feature point group displayed onto said predetermined space, wherein said feature comparator is configured to arrange the feature points extracted from said identifier subjected to the conversion in the said predetermined space, count the number of the feature points matching with said unique features, and select as a detection marker the identifier of which said count number is most numerous, out of the identifier not subjected to the conversion and one identifier subjected to the conversion, or two or more.

9. A marker generation detection device according to claim 8, wherein said first arranging unit is configured to arrange said extracted feature points in a feature space; and
- wherein said unique feature selector is configured to select as the unique features portions of said feature space in which the number of said feature points is equal to or less than a predetermined number.

10. A marker generation detection device according to claim 8, wherein said first arranging unit maps said extracted feature points onto an invariant feature space; and wherein said unique feature selector selects as the unique features portions of said invariant feature space in which the number of said feature points is equal to or less than a predetermined number.

11. A marker generation method comprising:

inputting an image;

extracting feature points from said image, and displaying these extracted feature points onto a predetermined space;

selecting as unique features portions of said space in which the number of said feature points is equal to or less than a predetermined number;

arranging the feature points extracted from an identifier in the predetermined space, and counting the number of the feature points matching with said unique features;

converting a configuration of said identifier, and extracting said feature points from this identifier subjected to the conversion; and arranging the feature points extracted from said identifier subjected to the conversion in said predetermined space, counting the number of the feature points matching with said unique features, and selecting as a detection marker the identifier of which said count number is most numerous, out of the identifier not subjected to the conversion and one identifier subjected to the conversion, or two or more.

12. A marker generation method according to claim 11, comprising arranging the feature points extracted from said identifier in a feature space, and determining that said existing identifier can be used as a marker that is detectable from said image when the number of the feature points matching with said unique features is equal to or more than a predetermined number.

13. A marker generation method according to claim 11, comprising arranging the feature points extracted from said identifier in an invariant feature space, and determining that said existing identifier can be used as a marker that is detectable from said image when the number of the feature points matching with said unique features is equal to or more than a predetermined number.

14. A non-transitory computer readable storage medium storing a marker generation program for causing an information processing device to execute the processes of:

inputting an image;

extracting feature points from said image, and displaying these extracted feature points onto a predetermined space;

selecting as unique features portions of said space in which the number of said feature points is equal to or less than a predetermined number;

arranging the feature points extracted from an identifier in the predetermined space, and counting the number of the feature points matching with said unique features;

converting a configuration of said identifier, and extracting said feature points from this identifier subjected to the conversion; and arranging the feature points extracted from said identifier subjected to the conversion in said predetermined space, counting the number of the feature points matching with said unique features, and selecting as a detection marker the identifier of which said count number is most numerous, out of the identifier not subjected to the conversion and one identifier subjected to the conversion, or two or more.

15. A non-transitory computer readable storage medium storing a marker generation program according to claim 14, causing the information processing device to execute a process of arranging the feature points extracted from said identifier in a feature space, and determining that said existing identifier can be used as a marker that is detectable from said image when the number of the feature points matching with said unique features is equal to or more than a predetermined number.

16. A non-transitory computer readable storage medium storing a marker generation program according to claim 14, causing the information processing device to execute a process of arranging the feature points extracted from said identifier in an invariant feature space, and determining that said existing identifier can be used as a marker that is detectable from said image when the number of the feature points matching with said unique features is equal to or more than a predetermined number.

* * * * *